United States Patent
Argov-Argaman et al.

(10) Patent No.: US 12,504,393 B2
(45) Date of Patent: Dec. 23, 2025

(54) METHOD AND SYSTEM FOR DETERMINING THE PROGESTERONE-ASSOCIATED PHYSIOLOGICAL STATE OF LACTATING COWS

(71) Applicant: Yissum Research Development Company of the Hebrew University of Jerusalem Ltd., Jerusalem (IL)

(72) Inventors: Nurit Argov-Argaman, Tel Aviv (IL); Zvi Shalom Roth, Gan Shlomo (IL); Yuri Feldman, Jerusalem (IL)

(73) Assignee: YISSUM RESEARCH DEVELOPMENT COMPANY OF THE HEBREW UNIVERSITY OF JERUSALEM LTD, Jerusalem (IL)

( * ) Notice: Subject to any disclaimer, the term of this patent is extended or adjusted under 35 U.S.C. 154(b) by 449 days.

(21) Appl. No.: 17/926,045

(22) PCT Filed: May 13, 2021

(86) PCT No.: PCT/IL2021/050559
§ 371 (c)(1),
(2) Date: Nov. 17, 2022

(87) PCT Pub. No.: WO2021/234689
PCT Pub. Date: Nov. 25, 2021

(65) Prior Publication Data
US 2023/0184708 A1  Jun. 15, 2023

Related U.S. Application Data

(60) Provisional application No. 63/026,063, filed on May 17, 2020.

(51) Int. Cl.
*G01N 27/02* (2006.01)
*G01N 33/04* (2006.01)

(52) U.S. Cl.
CPC .......... *G01N 27/026* (2013.01); *G01N 33/04* (2013.01)

(58) Field of Classification Search
CPC .............. G01N 27/026; G01N 33/04
(Continued)

(56) References Cited

U.S. PATENT DOCUMENTS

2019/0064174 A1* 2/2019 te Pas ................. G01N 33/743
2020/0363333 A1* 11/2020 Desphande ............ G01N 33/04
2022/0276242 A1* 9/2022 Dallerup Rasmussen ...................
G01N 33/54388

FOREIGN PATENT DOCUMENTS

WO  2012037974 A1  3/2012

OTHER PUBLICATIONS

International Search Report and Written Opinion dated Jul. 30, 2021 for corresponding International Application No. PCT/IL2021/050559.
(Continued)

*Primary Examiner* — Nathaniel T Woodward
(74) *Attorney, Agent, or Firm* — Tarolli, Sundheim, Covell & Tummino LLP

(57) ABSTRACT

The present invention related to a technique for determining the progesterone-associated physiological state of a lactating cow. The technique comprises determining at least one Milk Solid (MS)-related parameter in at least one milk sample from a lactating cow; and determining the progesterone-associated physiological state according to the Milk Solid (MS)-related parameter. Determining the progesterone-associated physiological state may comprise determining the progesterone level of the cow by correlating the MS-related parameter with calibrated data. The MS related parameter may comprise at least one of size, synthesis, composition of a MS, a pattern of progesterone concentration or direction of
(Continued)

progesterone concentration, or at least one dielectric parameter of the MS.

19 Claims, 28 Drawing Sheets

(58) Field of Classification Search
USPC .................................................. 73/61.71
See application file for complete search history.

(56) References Cited

OTHER PUBLICATIONS

Beckett et al. "Effects of Monensin on the Reproduction, Health, and Milk Production of Dairy Cows", Journal of Dairy Science, vol. 81, No. 6, Jun. 1, 1998, pp. 1563-1573.
Pennstate Extension: "Jun. 7, 2021 Milk Progesterone Analysis for Determining Reproductive Status/Milk-progesterone-Analysis-for-Determining Reproductive-Status 1/7", Sep. 21, 2016, retrieved from the internet URL:https://extension.psu.edu/milk-progesterone-analysis-for-determining-reproductive-status retrieved on Jul. 16, 2021.
Argov-Argaman, N., et al. (2014). "Elevated concentrate-to-forage ratio in dairy cow rations is associated with a shift in the diameter of milk fat globules and remodeling of their membranes." Journal of Dairy Science vol. 97, pp. 6286-6295.
Briard, V., et al. (2003). "The fatty acid composition of small and large naturally occurring milk fat globules." European Journal of Lipid Science and Technology, vol. 105, pp. 677-682.
Cohen, B.C., et al. (2015). "Regulation of lipid droplet size in mammary epithelial cells by remodeling of membrane lipid composition-a potential mechanism." PLoS One vol. 10, 3. doi: 10.1371/journal.pone.0121645.
Cohen, B., et al. "Lipid Droplet Fusion in Mammary Epithelial Cells is Regulated by Phosphatidylethanolamine Metabolism." J Mammary Gland Biol Neoplasia vol. 22, pp. 235-249 (2017) doi:10.1007/s10911-017-9386-7.
Couvreur, S., et al. (2007). "Composition of milk fat from cows selected for milk fat globule size and offered either fresh pasture or a corn silage-based diet." Journal of Dairy Science vol. 90, pp. 392-403.
Delbecchi, L., et al. (2006). "Suppression of estrous cycles in lactating cows has No. effect on milk production." Journal of Dairy Science vol. 89, pp. 636-639.
Goldberg, I.J., et al. (2009). "Regulation of fatty acid uptake into tissues: lipoprotein lipase- and CD36-mediated pathways." Journal of Lipid Research vol. 1, S86-S90.
Guo, Y., et al. (2008). "Functional genomic screen reveals genes involved in lipid-droplet formation and utilization." Nature vol. 453, pp. 657-661.
Haque, M.E., et al. (2001). "Influence of lipid composition on physical properties and PEG-mediated fusion of curved and uncurved model membrane vesicles: "nature's own" fusogenic lipid bilayer." Biochemistry 40, pp. 4340-4348.
Lacasa, D., et al. (2001). "Progesterone stimulates adipocyte determination and differentiation 1/sterol regulatory element-binding protein 1c gene expression. Potential mechanism for the lipogenic effect of progesterone in adipose issue." Journal of Biological Chemistry vol. 276, pp. 11512-11516.
Lass, A., et al. (2006). :Adipose triglyceride lipase-mediated lipolysis of cellular fat stores is activated by CGI-58 and defective in Chanarin-Dorfman Syndrome. Cell Metabolism 3, pp. 309-319.
Lopez, C., et al. (2008). "Phospholipid, sphingolipid, and fatty acid compositions of the milk fat globule membrane are modified by diet." Journal of Agricultural and Food Chemistry vol. 56, pp. 5226-5236.
Marcinkiewicz, A., et al. (2006). "The phosphorylation of serine 492 of perilipin a directs lipid droplet fragmentation and dispersion." Journal of Biological Chemistry vol. 281, pp. 11901-11909.
Masedunskas, A., et al. (2017). "Kinetics of milk lipid droplet transport, growth, and secretion revealed by intravital maging: lipid droplet release is intermittently stimulated by oxytocin." Molecular Biology of the Cell vol. 28(7), pp. 935-946. doi: 10.1091/mbc.E16-11-0776.
Mead, J.R., et al. (2002). "Lipoprotein lipase: structure, function, regulation, and role in disease." Journal of Molecular Medicine vol. 80, pp. 753-769.
Mesilati-Stahy, R., et al. (2014). "The relationship between size and lipid composition of the bovine milk fat globule is modulated by lactation stage." Food Chemistry vol. 145, pp. 562-570.
Mesilati-Stahy, R., et al. (2018). "Changes in lipid droplets morphometric features in mammary epithelial cells upon exposure to non-esterified free fatty acids compared with VLDL." PLoS One. doi: 10.1371/journal.pone.0209565.
Mesilati-Stahy, R., et al. (2012). "Association of plasma insulin concentration to fatty acid distribution between milk fat and membrane synthesis." Journal of Dairy Science vol. 95, pp. 1767-1775.
Paar, M., et al. (2012). "Remodeling of lipid droplets during lipolysis and growth in adipocytes." Journal of Biological Chemistry vol. 287(14), pp. 11164-11173.
Thiam, A.R., et al. (2013). "The biophysics and cell biology of lipid droplets." Nature Reviews Molecular Cell Biology vol. 14, pp. 775-786.
Wang, H., et al. (2011). "Unique regulation of adipose triglyceride lipase (ATGL) by perilipin 5, a lipid droplet-associated protein." Journal of Biological Chemistry vol. 286, pp. 15707-15715.
Yang, X., et al. (2010). "The G0/G1 switch gene 2 regulates adipose lipolysis through association with adipose triglyceride lipase." Cell Metabolism vol. 11, pp. 194-205.
K. Velek, et al., "IDEXX Milk Pregnancy Test—A new tool for Pregnancy Diagnosis in Cattle" The AABP Proceedings, vol. 45, IDEXX Laboratories Inc., Westbrook, ME (2012).
Kremer, F., "Dielectric spectroscopy—yesterday, today and tomorrow." J Non-Cryst Solids (2002), 305 (1-3), pp. 1-9.
Puzenko, A. et al., "Cole-Cole Broadening in Dielectric Relaxation and Strange Kinetics." Phys. Rev. Lett. (2010), 105, 037601-4.
K. L. Ngai et al., "Resolving the ambiguity of the dynamics of water and clarifying its role in hydrated proteins" Philos. Mag vol. 91 (13-15) (2011) pp. 1809-1835.
Keysight, "Basics of measuring the dielectric properties of materials", in: Application Note, Agilent Technologies, USA, (2006).
J. Kaatze, "Reference liquids for the calibration of dielectric sensors and measurement instruments" Meas. Sci. Technol., vol. 18 (2007) pp. 967-976.
Valerica Raicu and Yuri Feldman (2015) "Dielectric Relaxation in Biological Systems".

* cited by examiner

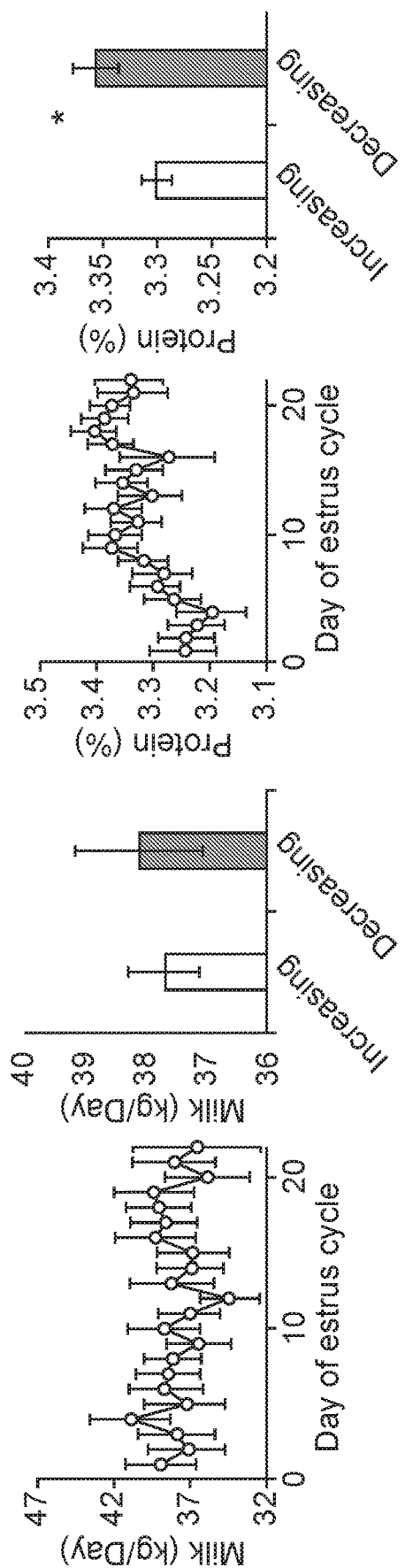
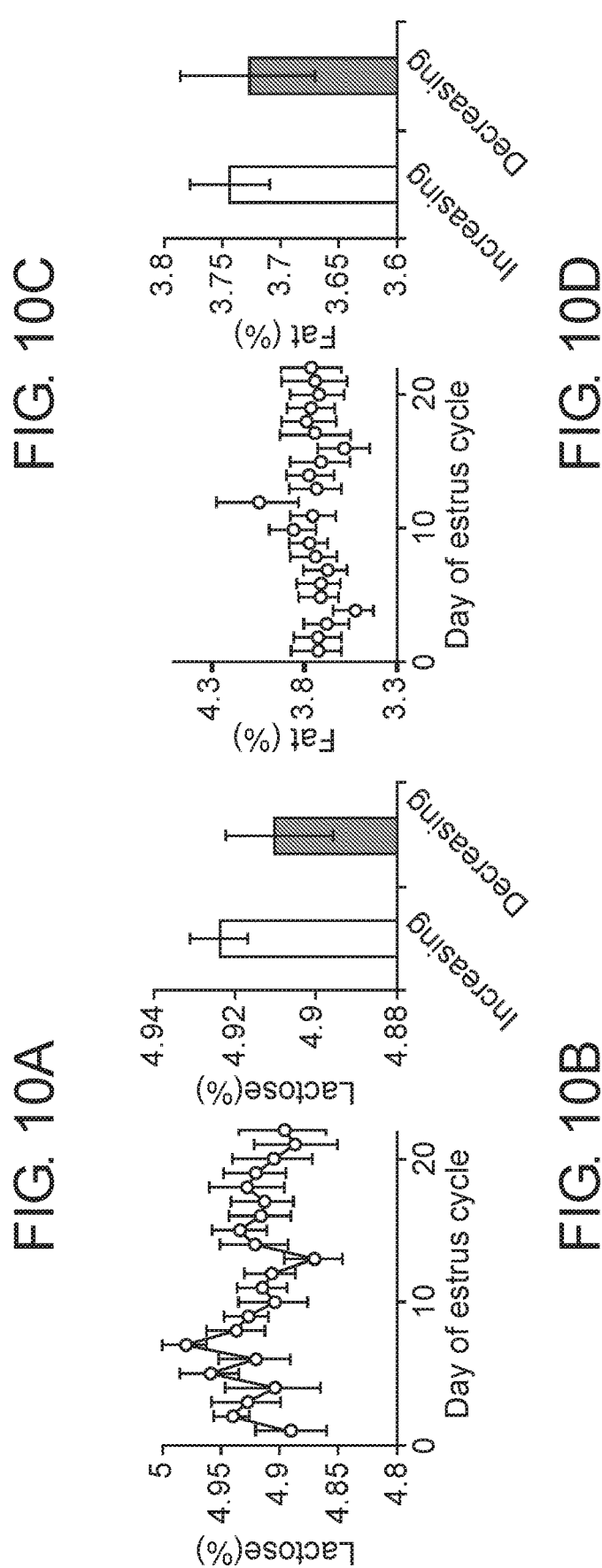
FIG. 10A
FIG. 10B
FIG. 10C
FIG. 10D

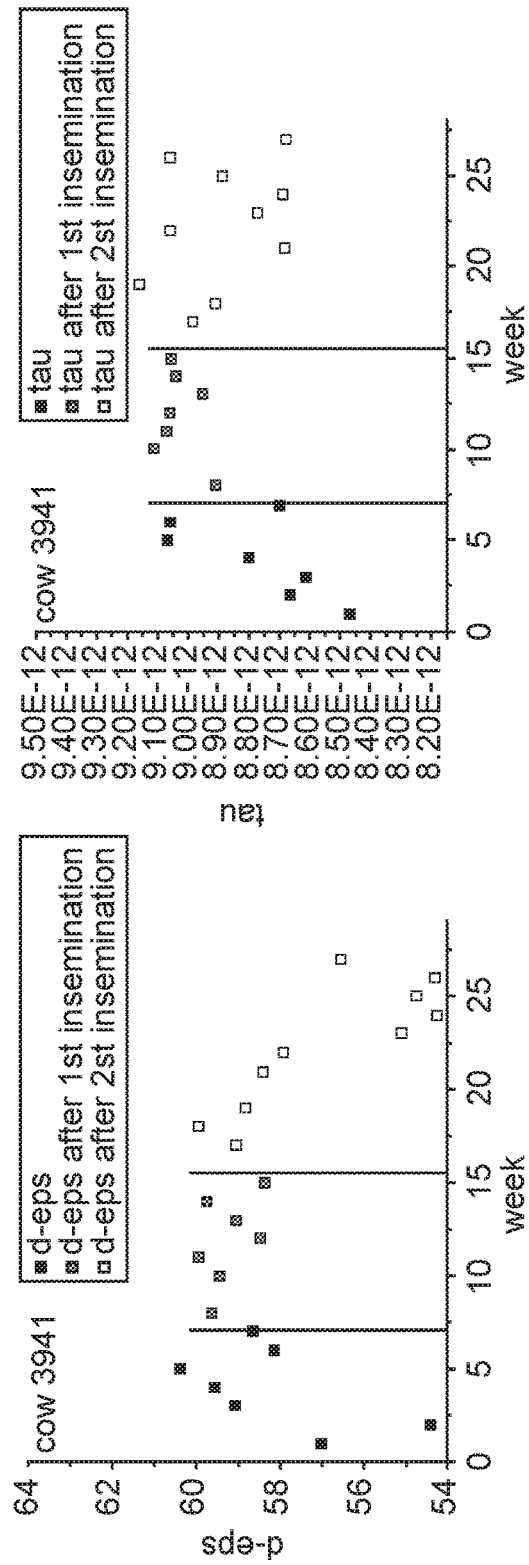
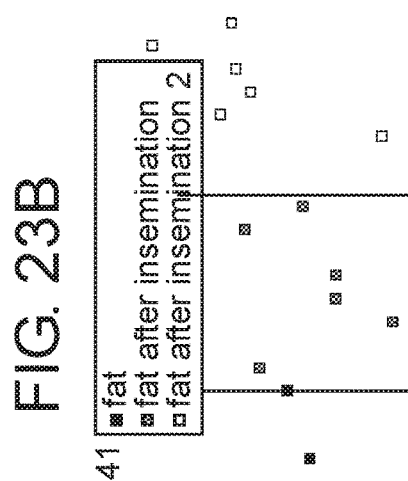
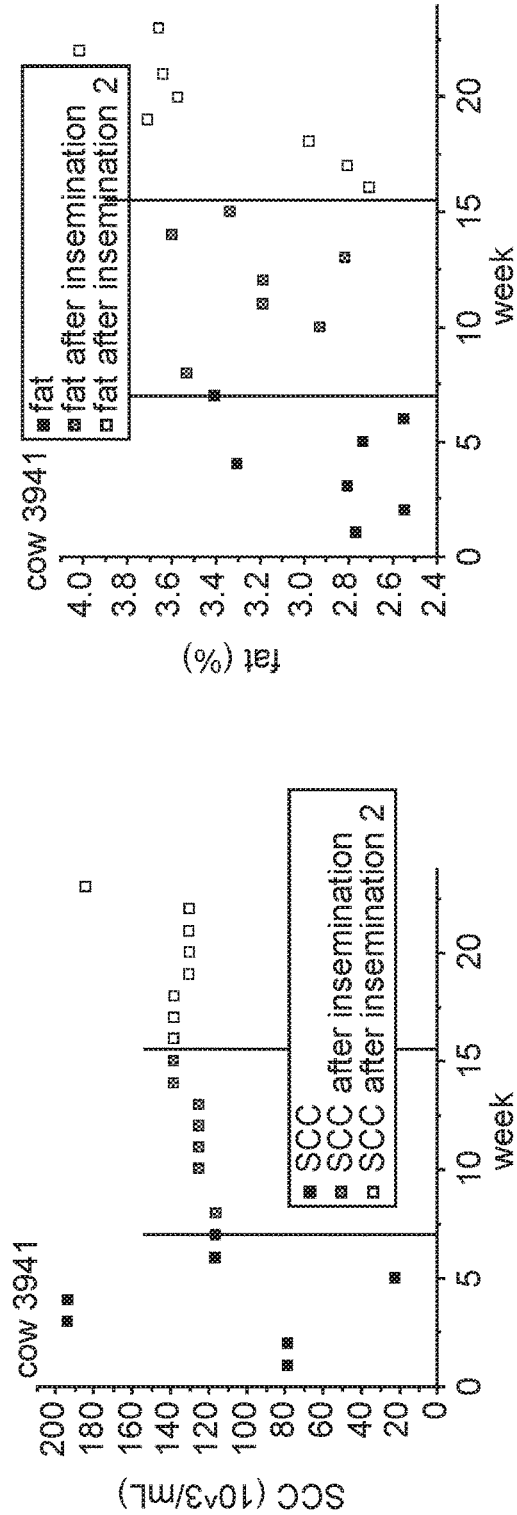
FIG. 23A  FIG. 23B  FIG. 23C  FIG. 23D

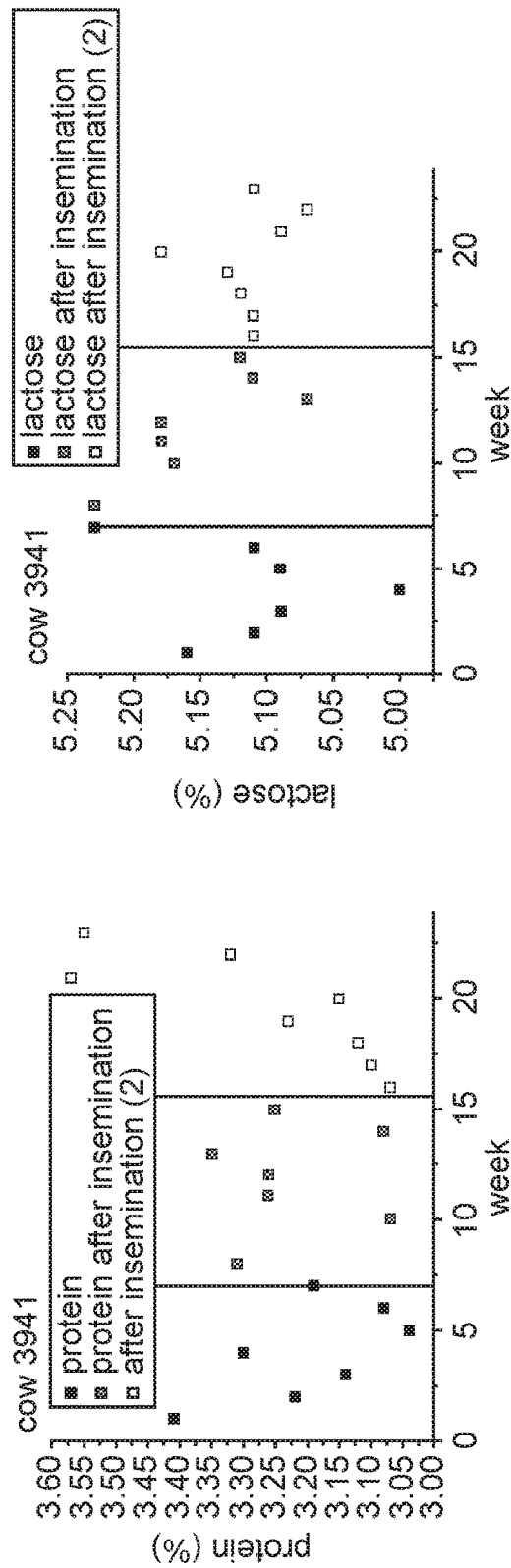
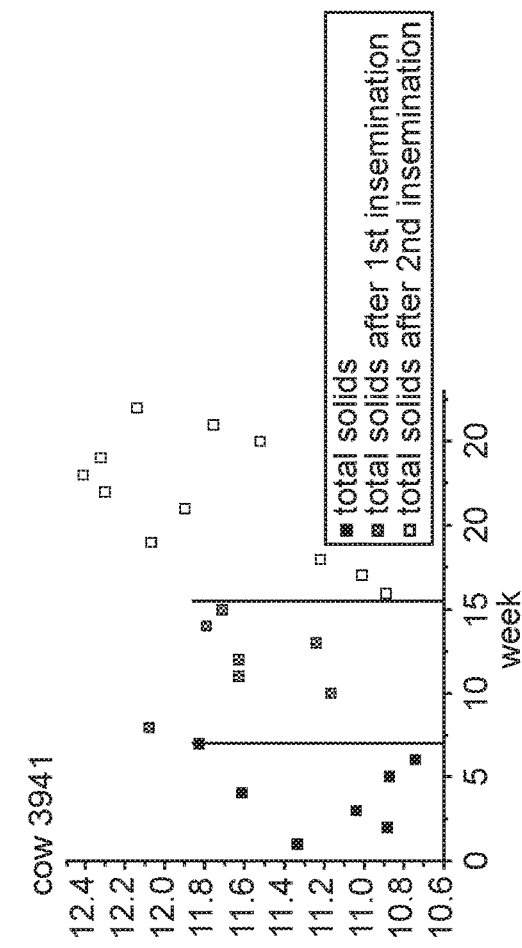
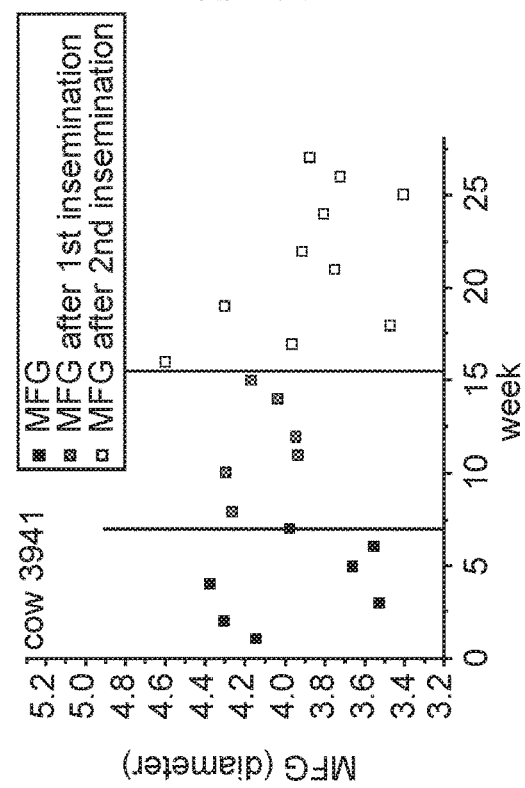

METHOD AND SYSTEM FOR DETERMINING THE PROGESTERONE-ASSOCIATED PHYSIOLOGICAL STATE OF LACTATING COWS

RELATED APPLICATIONS

The present application is a U.S. National Stage application under 35 USC 371 of PCT Application Serial No. PCT/IL2021/050559, filed on 13 May 2021, which claims priority from U.S. Provisional Application Ser. No. 63/026,063, filed on 17 May 2020, the entirety of each of which is incorporated herein by reference.

TECHNOLOGICAL FIELD

The invention relates to a technique for monitoring the progesterone-associated physiological state of lactating cows.

BACKGROUND ART

References considered to be relevant as background to the presently disclosed subject matter are listed below:
1. Argov-Argaman, N., Mesilati-Stahy, R., Magen, Y., and Moallem, U. (2014). Elevated concentrate-to-forage ratio in dairy cow rations is associated with a shift in the diameter of milk fat globules and remodeling of their membranes. Journal of Dairy Science 97, 6286-6295.
2. Briard, V., Leconte, N., Michel, F., and Michalski, M. C. (2003). The fatty acid composition of small and large naturally occurring milk fat globules. European Journal of Lipid Science and Technology 105, 677-682.
3. Cohen, B. C., Shamay, A., and Argov-Argaman, N. (2015). Regulation of lipid droplet size in mammary epithelial cells by remodeling of membrane lipid composition—a potential mechanism. PLOS One 10, 3. doi: 10.1371/journal.pone.0121645
4. Cohen, B., Raz, C., Shamay, A. et al. Lipid Droplet Fusion in Mammary Epithelial Cells is Regulated by Phosphatidylethanolamine Metabolism. J Mammary Gland Biol Neoplasia 22, 235-249 (2017) doi: 10.1007/s10911-017-9386-7.
5. Couvreur, S., Hurtaud, C., Marnet, P. G., Faverdin, P., and Peyraud, J. L. (2007). Composition of milk fat from cows selected for milk fat globule size and offered either fresh pasture or a corn silage-based diet. Journal of Dairy Science 90, 392-403.
6. Delbecchi, L., and Lacasse, P. (2006). Suppression of estrous cycles in lactating cows has no effect on milk production. Journal of Dairy Science 89, 636-639.
7. Goldberg, I. J., Eckel, R. H., and Abumrad, N. A. (2009). Regulation of fatty acid uptake into tissues: lipoprotein lipase- and CD36-mediated pathways. Journal of Lipid Research 1, S86-S90.
8. Guo, Y., Walther, T. C, Rao, M., Stuurman, N., Goshima, G., Terayama, K., and Farese, R. V. (2008). Functional genomic screen reveals genes involved in lipid-droplet formation and utilization. Nature 453, 657-661.
9. Haque, M. E., McIntosh, T. J., and Lentz, B. R. (2001). Influence of lipid composition on physical properties and PEG-mediated fusion of curved and uncurved model membrane vesicles: "nature's own" fusogenic lipid bilayer. Biochemistry 40, 4340-4348.
10. Lacasa, D., Le Liepvre, X., Ferre, P., and Dugail, I. (2001). Progesterone stimulates adipocyte determination and differentiation 1/sterol regulatory element-binding protein 1c gene expression. Potential mechanism for the lipogenic effect of progesterone in adipose tissue. Journal of Biological Chemistry 276, 11512-11516.
11. Lass, A., Zimmermann, R., Haemmerle, G., Riederer, M., Schoiswohl, G., Schweiger, M., et al. (2006). Adipose triglyceride lipase-mediated lipolysis of cellular fat stores is activated by CGI-58 and defective in Chanarin-Dorfman Syndrome. Cell Metabolism 3, 309-319.
12. Lopez, C., Briard-Bion, V., Menard, O., Rousseau, F., Pradel, P., and Besle, J. M. (2008). Phospholipid, sphingolipid, and fatty acid compositions of the milk fat globule membrane are modified by diet. Journal of Agricultural and Food Chemistry 56, 5226-5236.
13. Marcinkiewicz, A., Gauthier, D., Garcia, A., and Brasaemle, D. L. (2006). The phosphorylation of serine 492 of perilipin a directs lipid droplet fragmentation and dispersion. Journal of Biological Chemistry 281, 11901-11909.
14. Masedunskas, A., Chen, Y., Stussman, R., Weigert, R., and Mather, I. H. (2017). Kinetics of milk lipid droplet transport, growth, and secretion revealed by intravital imaging: lipid droplet release is intermittently stimulated by oxytocin. Molecular Biology of the Cell 28 (7), 935-946. doi: 10.1091/mbc. E16-11-0776
15. Mead, J. R., Irvine, S. A., and Ramji, D. P. (2002). Lipoprotein lipase: structure, function, regulation, and role in disease. Journal of Molecular Medicine 80, 753-769.
16. Mesilati-Stahy, R., and Argov-Argaman, N. (2014). The relationship between size and lipid composition of the bovine milk fat globule is modulated by lactation stage. Food Chemistry 145, 562-570.
17. Mesilati-Stahy, R., and Argov-Argaman, N. (2018). Changes in lipid droplets morphometric features in mammary epithelial cells upon exposure to non-esterified free fatty acids compared with VLDL. PLOS One. doi: 10.1371/journal.pone.0209565
18. Mesilati-Stahy, R., Malka, H., and Argov-Argaman, N. (2012). Association of plasma insulin concentration to fatty acid distribution between milk fat and membrane synthesis. Journal of Dairy Science 95, 1767-1775.
19. Paar, M., Jüngst, C., Steiner, N. A., Magnes, C., Sinner, F., Kolb, D., et al. (2012). Remodeling of lipid droplets during lipolysis and growth in adipocytes. Journal of Biological Chemistry 287 (14), 11164-11173.
20. Thiam, A. R., Farese, J. R. V., and Walther, T. C. (2013). The biophysics and cell biology of lipid droplets. Nature Reviews Molecular Cell Biology 14, 775-786.
21. Wang, H., Bell, M., Sreenivasan, U., Hu, H., Liu, J., Dalen, K., et al. (2011). Unique regulation of adipose triglyceride lipase (ATGL) by perilipin 5, a lipid droplet-associated protein. Journal of Biological Chemistry 286, 15707-15715.
22. Yang, X., Lu, X., Lombès, M., Rha, G. B., Chi, Y. I., Guerin, T. M., et al. (2010). The G0/G1 switch gene 2 regulates adipose lipolysis through association with adipose triglyceride lipase. Cell Metabolism 11, 194-205.
23. K. Velek, et. Al., IDEXX Milk Pregnancy Test-Anew tool for Pregnancy Diagnosis in Cattle, IDEXX Laboratories Inc., Westbrook, ME (2012).
24. Kremer, F., Dielectric spectroscopy-yesterday, today and tomorrow. J Non-Cryst Solids 2002, 305 (1-3), 1-9.
25. Puzenko, A.; Ben Ishai, P.; Feldman, Y., Cole-Cole Broadening in Dielectric Relaxation and Strange Kinetics. Phys. Rev. Lett. 2010, 105, 037601-4

26. K. L. Ngai et al., Resolving the ambiguity of the dynamics of water and clarifying its role in hydrated proteins, Philos. Mag 91 (13-15) (2011) 1809-1835.
27. Keysight, Basics of measuring the dielectric properties of materials., in: Application Note, Agilent Technologies, USA, 2006.
28. U. Kaatze, Reference liquids for the calibration of dielectric sensors and measurement instruments, Meas. Sci. Technol., 18 (2007) 967-976,
29. Valerica Raicu and Yuri Feldman. 2015. Dielectric Relaxation in Biological Systems.

Acknowledgement of the above references herein is not to be inferred as meaning that these are in any way relevant to the patentability of the presently disclosed subject matter.

BACKGROUND

The dairy industry is based on and depends on cows' conception rates since milk production occurs postpartum. To that end, conception rates, pregnancies and embryo loses are closely monitored by veterinarians. This procedure is time consuming and expensive. The changes in reproduction status (e.g. estrous, pregnancy and embryo loss) are closely associated with progesterone levels in the cow's plasma which are minimal during estrous, rising until day 9 post-estrous, and declining to the pre-estrous level in case that no pregnancy occurs. If conception occurs, progesterone levels are kept at plateau until birth, or in case of early embryonic death or abortion, here is a rapid decline in progesterone levels to their basal, pre-estrous levels. It is therefore extremely important for dairy farmers to closely monitor progesterone levels in dairy cows or to find alternative indicators that relate to the reproductive state of the cows.

Currently, progesterone levels are monitored by collecting blood samples from the cows by a veterinarian, the samples are transferred to a commercial laboratory and are analyzed using an expensive commercial kit. Differences in milk fat structure, associated with differences in the estrous cycle stage of cows have been detected by the inventors of the present invention.

Milk fat is secreted in a unique structure termed milk fat globule (MFG), which consists of a triglyceride core covered with three layers of polar lipids and proteins termed MFG membrane. Milk polar lipid composition and concentration are closely associated with lactation stage [16], genetic predisposition, plasma insulin concentration and diet [12]. In general, milk polar lipid composition and concentration are altered when systemic or local (within the mammary gland) changes in lipid metabolism are induced. Two factors with a known effect on whole-body lipid metabolism are insulin and progesterone. In dairy cows, the concentrations of both hormones are frequently altered by stage of lactation and during the animal's estrous cycle. However, little is known on their individual and combined effects on lipid composition in milk.

The MFG is the structure utilized by the mammary gland epithelial cells (MEC) to secrete milk fat. Formation of the MFG initiates in the endoplasmic reticulum through the release of a triglyceride (Tg) droplet covered with one layer of endoplasmic reticulum phospholipids (PL) into the cytoplasm. From its origin site, the cytoplasmic lipid droplet migrates to the apical pole of the cell, where it is pinocytosed into the alveolar lumen. During this process, it is enveloped by the plasma membrane bilayer, forming the MFG membrane. The MFG membrane consists of glycoproteins (20-60%) and glycerophospholipids (33%), primarily phosphatidylcholine (PC) and sphingomyelin (SM), and more minor contents of phosphatidylethanolamine (PE), phosphatidylinositol (PI), and phosphatidylserine (PS) [12].

The MFG are secreted into milk in a wide range of sizes, from 200 nm to 15 µm. The average diameter is associated with lactation stage, energy balance [12], diet [1, 2], genetic background [1,5], and interactions among these factors. The differences in MFG size may be attributed to several mechanisms including, but not limited to: fusion between intracellular lipid droplets during their migration to the apical pole of the cell [3, 14]; the balance between lipolysis and lipogenesis processes, regulated by lipases and PAT proteins, which in turn regulate Tg hydrolysis in the lipid droplet [19]; and limited availability of envelope material such as PC, which results in a higher volume-to-surface area ratio and increased lipid droplet size [8]. The availability of long-chain fatty acids has been suggested to limit the capacity to synthesize membrane material [1], consequently also affecting lipid droplet size [8]. This hypothesis is further supported by the recent findings of the inventors of the present invention indicating different amount and size of lipid droplet in mammary epithelial cells (MEC) treated with fatty acids at different levels of bioavailability [17].

Many of the lipogenic processes are regulated by the animal's metabolic status [19]. For instance, in the mammary gland tumor cell line MCF7, the major lipogenic regulatory factor, sterol regulatory element binding protein 1c (SREBP1c), is upregulated by progesterone, which in turn stimulates the expression of the lipogenic genes acetyl COA carboxylase (ACC) and fatty acid synthase (FAS) [10]. In addition, studies have demonstrated a regulatory effect of progesterone on another lipogenic enzyme, lipoprotein lipase (LPL) in the mammary gland, which in turn may change the availability of long chain fatty acids to the mammary gland cells.

In dairy cows, plasma progesterone concentration varies along the 21-day estrous cycle, which has two main phases; The follicular phase is characterized by a large diameter preovulatory follicle (>15 mm), high estradiol concentration and low progesterone concentrations (0.5-1 ng/ml) in the plasma. The luteal phase starts after ovulation and is characterized by increased plasma progesterone concentration through the first 7 days of the estrus cycle. On days 8-10 of the cycle, the progesterone concentration peaks (4-6 ng/ml) and remains at this level till days 16-17 of the cycle. Thereafter, the progesterone concentration declines to basal levels, to enable new ovulation and initiation of a new estrous cycle. In the case of successful fertilization, the progesterone level remains high and stable to support the developing embryo and pregnancy.

As described above, knowing the pregnancy status is important to achieve a successful a reproductive management. Intensive reproductive management is mostly based on monitoring the estrous timing, which based on the cow behavior and activity. The appearance of estrous determines the timing of insemination. The interval between onset of estrus and ovulation plays a pivotal rule in fertilization successes. Taking into account that ovulation occurs within 24-48 h post estrous and that sperm survive in the female reproductive tract for few days (1 to 5), artificial insemination is practically occurred within 12 h of onset of estrus. The conception rates of high producing dairy cows are approximately 30-40% during the winter, and decrease during the hot season to 15-20%, because cows are exposed to environmental heat stress. The reduced conception rate in the dairy herds is multifactorial in nature and might involve fertilization failure as well as embryonic loss or abortion i.e. the events of ovulation and fertilization were successful, but the formed embryo does not survive. The current management allows a detection of this cascade of events by observing subsequent estrus behavior within 20 to 40 days post insemination. Acknowledging the low conception rates, this delayed detection of unsuccessful insemination, fertilization or pregnancy can sum up to a significant period of non-profit lactation. Therefore, early detection of pregnancy loss might provide the farmer or the veterinarian an important information which in turn enable to take a rapid decision about the next optimal insemination time in order to minimize the economic loss i.e. increased days of being non-pregnant.

General Description

It would therefore be beneficial to provide a non-invasive, cheap and quick method for determining progesterone-associated physiological state in dairy cows and make predictive models.

Therefore, there is a provided a novel method for determining progesterone-associated physiological state of a lactating cow. The progesterone-associated physiological state of the lactating cow may be at least one of anestrus state, estrous state, pregnant state, undergoing an abortion, in the increasing or decreasing phase of the estrous cycle, or disease state (such as mastitis, ketosis, inflammation, etc). In particular, the invention can thus determine/predict the reproduction status of a cow or detect physiological changes associated with change in MS related parameter such as MFG size or a change in milk solids. The method comprises determining at least one Milk Solid (MS)-related parameter in at least one milk sample from a lactating cow; and determining progesterone-associated physiological state according to the MS-related parameter.

The term "MS related parameter" hereinafter refers to any physical property being affected by the change in the progesterone level, and which may be correlated with the milk solids (fat, protein, lactose). One of the "MS related parameter" is the "MFG-related parameter" as will be described in detail further below.

In a specific and non-limiting example, these parameters can be measured by on-line equipment like "afi-lab". For example, the MS-related parameter may comprise at least one of size, synthesis, composition of a MS, a pattern of progesterone concentration or direction of progesterone concentration, or at least one dielectric parameter of the MS.

In some embodiments, the MS-related parameter may be indicative of any change in the MS structure such as the average MS size or size distribution of MSs, % change in MS size or % change in MS size over time, rate of change in MS size, where the size distribution and change are relative to the average basal MS size of the cow.

In some embodiments, detecting changes in progesterone levels, can also provide information regarding the reproductive state of the cow.

The role of progesterone in mammogenesis and secretory activation of mammary cells in the last days of gestation has been thoroughly studied and well documented. There are some evidences that progesterone is involved in lipid metabolism pathways in the mammary gland. This process includes synthesis, secretion and size regulation of milk fat globules (MFG), regulation of total fat content in the cell, as well as the stability of its membranes. The inventors of the present invention have found a direct correlation between the progesterone concentration in the plasma of lactating cows and MFG size. This finding led to the realization, that instead of directly determining the progesterone level in the plasma using an invasive, time consuming, and expensive procedure, it is possible to measure at least one MS parameter such as the MFG size in a milk sample and from this parameter to determine, the progesterone level using calibrated data. In this connection, it should be noted that the different MS parameters can be used separately or in combination into the correlation analysis. However, all the MS parameters defined above do not have the same weight in the correlation analysis with the progesterone-associated physiological state. The inventors have found that the MFG size can be used without the combination with the other parameters to provide the progesterone levels of the cow to be correlated with the progesterone-associated physiological state. In particular, they studied the role of progesterone in the regulation of milk fat globule size using in-vivo and in-vitro models to explore the involvement of progesterone in the regulation of MFG size. In particular, the inventors have examined whether changes in progesterone concentration through the estrous cycle are associated with MFG size. They found that the progesterone affects the regulation of milk fat globule being very low-density lipoprotein (VLDL) dependent. More specifically, the progesterone plays a pivotal role during mammogenesis and serves as an inhibitor of the secretory activation of mammary cells in the last days of gestation. However, its role during lactogenesis, in particular its involvement in lipid metabolism, milk fat content and composition, is unknown. The present invention provides a new evidence of progesterone's involvement in the regulation of milk fat globule (MFG) synthesis and secretion. Findings from both in-vivo and in-vitro studies indicated that the concentration and the direction (increase vs. decrease) of progesterone concentration to which the mammary epithelial cells (MEC) are exposed, affect MFG size. This was found to be VLDL-dependent: in the presence of VLDL, the proportion of MEC with small lipid droplets (<1 μm) increased 2.4-fold, and the proportion of large lipid droplets (>1 μm) increased 4-fold; in the absence of VLDL, no differences were found. The findings add to the understanding of the mechanism underlying the regulation of MFG size and provide new evidence for progesterone's role in lipid metabolism in the mammary gland during lactogenesis. The fact that the size, synthesis and composition of MFG are affected by the cyclic pattern of progesterone concentration in the circulation might have physiologically relevant consequences, in particular on milk as a nutritional source.

As described above, knowing the pregnancy status is important to achieve a successful a reproductive management. Currently the ability to detect early embryonic loss is mostly based on retrospective data of estrus cycle intervals. Pregnant cow should not appear in estrus. If so, it indicates a failure, and this cow should be treated accordingly. In light of this, to minimize events that the affect the profitability and to reduce repeatable invasive physical examination by the veterinarian, a rapid, on farm, continuous and non-invasive methods is required.

Between the ways of determining pregnancy in cows, the most reliable is rectal palpation and ultrasound examination. Rectal palpation is generally done between 40 to 44 days after artificial insemination while the ultrasound is effective earlier, 26 to 35 days after insemination. Nevertheless, the above-mentioned methods are both invasive, time consuming and required a professional labor. In particular, rectal palpations can cause abortions and using ultrasound probes occasionally can lead to the rectum perforation inducing massive peritonitis [23]. Again, there is a real need to develop on practical non-invasive high throughput methods, which might enable detection of reproductive events, in particular pregnancy.

In some embodiments, a simple, fast, and non-expensive technique for determining the plasma progesterone level of lactating cows may be implemented by measuring MFG size and comparing this parameter with predetermined calibrated data. The MFG size may be monitored in the milk to estimate the progesterone level. Moreover, continuous measurements of at least one MS-related parameter can be used to define reproduction events/status.

Therefore, in some embodiments, the method further comprises detecting changes in progesterone levels and determining the progesterone-associated physiological state according to the MFG-related parameter.

In some embodiments, determining the at least one MFG-related parameter comprises collecting size data being indicative of the MFG-related parameter.

In some embodiments, determining the progesterone-associated physiological state of the cow comprises correlating the MS-related parameter with calibrated data.

In some embodiments, the method further comprises determining MS-related parameters from milk samples of a plurality of control lactating cows having known progesterone levels to obtain the calibrated data and comparing the determined progesterone levels with the known progesterone levels of the lactating cow. The calibrated data may thus be obtained by collecting MFG-related parameters from milk samples of a plurality of control lactating cows having known progesterone levels.

Milk fat and the MFG is just one of the solids in milk. In fact, milk is a complex colloidal liquid that is composed by 87% of water. In biological systems, water is classified as bulk or bound water. Interestingly, structural alterations are reflected in a modified state of bulk water. To investigate the correlation between structures inside milk and the state of bulk water, the inventors have studied the dielectric properties of water in milk to determine whether it is affected by at least one Milk Solid (MS)-related parameter.

As described above, additionally or alternatively, one of the MS parameters may the dielectric responses of the milk used in combination or not with the other MS parameters. More specifically, it has been found that the change in MFG structure (i.e. size) which is associated with progesterone levels and the reproductive state of the cow, also affects the bulk water. This change in water can be therefore detected by dielectric spectroscopy which is widely used to study the dielectric relaxation processes originated from the presence of bulk water which are known as Y dispersion.

According to one aspect of the invention, the study of the dielectric properties of milk, as affected by the change in MS related parameters due to change in progesterone levels, provides a novel non-invasive method of pregnancy detection. The used technique, known as dielectric spectroscopy [29], allows quickly and accurately to acquire frequency spectra of permittivity and conductivity. From the analysis of the dielectric spectra of a biological system with theoretical models, it is possible to obtain the physical parameters of macromolecule conformations.

In some embodiments, the effect of pregnancy state can be identified on the dielectric response of water in raw milk. For example, the decrease in the variation of average size of MS can lead to a stabilization of the quantity of bulk water in milk. Such stabilization can be identified by measuring the variations of the dielectric parameters that are expected to also reduce fluctuations.

In this regard, milk provides a biofluid with variety of bio molecules, derived from blood or from local production that can be modulated by the endocrine system. As described above, the MS size is associated with progesterone levels and it changes through the estrous cycle of dairy cows.

Using Dielectric Spectroscopy (DS) methods, it is possible to investigate the relaxation processes in a wide frequency range from 10-1 to 1012 Hz for biological systems [24]. The properties of biological materials are characterized by three major dispersions: a dispersion, which corresponds to low frequencies, $\beta$ dispersion that are in the RF frequencies and $\gamma$ dispersions, which can be observed in the microwave frequencies.

Water is an integral component of biological systems; it has been classified in two forms: the bulk, and the bound (or hydration) water in vicinity of a biomolecular surface [26]. Dielectric responses of milk within 0.5-50 GHz frequency band are associated with the changes of bulk water properties and correspond to $\gamma$-dispersion.

Water molecules possess a permanent electric dipole moment (1.84 D), which provides their coupling to external electric fields. Such characteristic is used in DS as a marker for the molecular orientation. The dominant relaxation process of bulk water occurs around 18 GHz at room temperature.

In general, the water's dielectric relaxation peak in aqueous solutions can be described by the phenomenological Cole-Cole (CC) function.

$$\varepsilon^*(\omega) = \varepsilon'(\omega) - i\varepsilon''(\omega) = \varepsilon_h + \frac{\Delta\varepsilon}{1+(i\omega\tau)^\alpha}, \quad (1)$$

Here $\varepsilon'$ and $\varepsilon''$ are the real and the imaginary parts of the complex permittivity, $\omega=2\pi f$ is the cyclic frequency, and i2=−1. The parameter En denotes the extrapolated high-frequency permittivity and $\Delta\varepsilon=\varepsilon_l-\varepsilon_h$, is the relaxation amplitude (with the low-frequency permittivity limit denoted by $\varepsilon_l$). The parameter t is the relaxation time. The exponent $\alpha$ (0<$\alpha$≤1) is a measure of the symmetrical broadening. Whenever water interacts with another dipolar or charged entity, asymmetrical broadening of its dispersion peak and a change in the attendant relaxation time is induced As described above, the study of the dielectric properties of milk enables to determine a change in at least one MS related parameter due to change in progesterone levels. Dairy cows are characterized to undergo estrous cycles which last 21 days, during these cycles, the concentration of progesterone in the blood varies and characterized by two phases: the follicular phase that is characterized by low levels of progesterone (0.5 to 1 ng/ml) mostly the time before and after ovulation and the luteal phase when a peak of progesterone is reached (4-6 ng/ml), 7-16 days after ovulation. If pregnancy occurs, the high concentration of progesterone will be maintained through the pregnancy period until the beginning of the caving process. In the absence of pregnancy, progesterone levels will remain high until 15-17 days and then will drop to the concentration characteristic of the follicular phase. As described above, studying the dielectric properties of milk, enables to monitor the progesterone levels of the lactating cow. More specifically, the dielectric response of milk differs from the bulk water by a smaller static dielectric permittivity, a shift and broadening in the main relaxation process peak and the appearance of the dc conductivity tail. Therefore, in some embodiments, determining the progesterone level of the cow may comprise identifying a dielectric response of water in at least one milk sample, determine at least one variation of the dielectric pattern of the MS and analyzing at least one change in the dielectric pattern including at least one of static dielectric permittivity, a shift and broadening in a main relaxation process peak and appearance of the DC conductivity tail.

In some embodiments, identifying a dielectric response of water in at least one milk sample comprises determining the dielectric properties of water in milk during different reproductive states.

In some embodiments, determining at least one dielectric parameter of the MS comprises extracting from a dielectric spectrum of the milk sample in a frequency range of about 0.5 GHz to 60 GHz, data indicative of a measureable change in at least one of such spectral parameters as broadening and position of a main relaxation peak of the dielectric spectrum, the main relaxation peak being associated with the dielectric response of the water, and the change in the spectral parameters of the main relaxation peak in the frequency range being indicative of a modification response of the at least one MS parameter caused by changes in progesterone levels.

In some embodiments, determining the progesterone level of the cow comprises fitting a measured dielectric spectrum of the milk sample to the Cole-Cole dielectric function and a conductivity term as follows: $\hat{\varepsilon}^*(\omega) = \Delta\varepsilon/(1+(i\omega\tau)^{\hat{}}\alpha) + \sigma/(i\omega\varepsilon\_0) + \varepsilon\_\infty$ where $\Delta\varepsilon$ is the dielectric strength, $\tau$ is the characteristic relaxation time, $\alpha$ is the broadening parameter, $\sigma$ is the dc conductivity, $\varepsilon\_0$ is the permittivity of free space and $\varepsilon\_\infty$ is the high frequency limit of the real component of the dielectric permittivity.

In some embodiments, the method comprises performing a correlation between the dielectric parameters and at least one other MS parameter to determine the progesterone-associated physiological state. In a specific and non-limiting example, this may be implemented by using a Principal Component Analysis (PCA) analysis which combines the different MS parameters, including MFG size and dielectric responses to predict reproductive status such pregnancy or early embryonic loos.

Additionally or alternatively, the present invention provides a technique for determining whether the lactating cow is anestrus, estrous, pregnant, undergoing an abortion, or in the increasing or decreasing phase of the estrous cycle. This may be implemented by providing a method for determining the progesterone-associated physiological state of a lactating cow comprising obtaining a plurality of milk samples from a lactating cow, measuring at least one MS-related parameter in at least one milk samples, and determining the progesterone-associated physiological state according to the plurality of measurements. The estrous cycle of cattle is the period from one estrus (heat, phase of sexual receptivity) to the next estrus. The entire estrous cycle averages 21 days long, with a typical range of 18 to 24 days. After puberty, the female exhibits continued estrous cycles. At the beginning of the estrous cycle, progesterone, a steroid hormone that must be in the blood to establish and maintain pregnancy, increases. Elevated concentrations of progesterone can be detected about 5 days after standing estrus. If a cow does not become pregnant, concentrations of progesterone will begin to decrease around day 17 of the estrous cycle. Anestrus occurs when an animal does not exhibit normal estrous cycles, most common before puberty and after calving.

In dairy cows, the artificial insemination technician must know the best time to deposit semen for optimum fertility. Thus, there is a need to carefully monitor progesterone levels of the cows in order to determine the reproduction status of a cow.

It was presently found that changes in the pattern of progesterone concentration (increased vs. decreased phase) during the estrous cycle modulate lipid metabolism in the mammary gland and hence affect the milk lipids.

Specifically, the effect of progesterone on milk fat structure, expressed as milk fat globule size was studied in both in-vitro and in-vivo models. Two studies were conducted: 1) an in-vitro model of a primary culture of mammary epithelial cells which were exposed to different progesterone levels, and to two different patterns of altered progesterone levels, similar to the concentration patterns which occur throughout the estrous cycle and 2) an in-vivo study using 12 multiparous synchronized cows, which were monitored daily throughout an estrous cycle by ultrasound, blood and milk samples. In both models, results showed that progesterone levels are associated with milk fat globule (MFG) size. Moreover, the different pattern of progesterone concentration affected MS mean diameter and size distribution.

One embodiment relates to a method for determining the progesterone level of a lactating cow comprising: obtaining a milk sample from a lactating cow, measuring at least one MS-related parameter of the milk sample, and correlating the MS-related parameter to the progesterone level of the cow. In some embodiments, the correlation is done by comparing the MS-related parameter with calibrated data.

In some embodiments, the MS-related parameter is determined according to the MS shape or MS shape distribution. In one embodiment, the MS-related parameter is determined by a machine-learning model trained using a set of historical data. In some of these embodiments the machine-learning model is capable of image analysis.

This method has advantages over the existing routine progesterone assays which includes sampling of milk or blood from individual cows manually, transferring the sample to the lab, separating plasma from blood and using a relatively slow and expensive (in terms of professional manpower and materials) assay to measure progesterone levels.

The method can be used for routine monitoring of lactating cows. Accordingly, one embodiment relates to a method for monitoring progesterone levels of a lactating cow, comprising: obtaining milk samples from the lactating cow over time, measuring at least one MS-related parameter of the milk samples, correlating the MS-related parameter to progesterone level according to calibrated data, and comparing these progesterone levels with previous progesterone levels of the lactating cow.

In some embodiments, the method further comprises non-invasively collecting daily at least one milk sample during the normal milking routine of the lactating cow. The milk sample may thus be milk collected during the normal milking routine by the dairy farmer. The method is therefore advantageous as it is non-invasive and multiple milk samples are easily collected. It is therefore preferred, that the method is performed regularly, preferably daily. Thus, in some embodiments of the method, the milk samples are collected daily, and even several times a day.

Another advantage of determining progesterone levels by measurement of MFG size in milk samples is that the data may be collected directly by the automated herd management system (in an online automatic and continuous manner) and can therefore be aligned with other collected data such as pedometric data, time of insemination and other health or reproductive parameters. In some embodiments the milk samples are collected during the normal milking routine of the lactating cow.

Another embodiment relates to a method for determining the progesterone-associated physiological state of a cow comprising: obtaining a plurality of milk samples from a lactating cow, measuring at least one MS-related parameter in the plurality of milk samples, and determining the progesterone-associated physiological state according to these measurements.

According to some embodiments, the method further comprises monitoring the progesterone-associated physiological state of the cow and eliciting an alert when the progesterone-associated physiological state of the cow has changed.

According to another aspect of the present invention, there is provided a system for determining progesterone associated physiological state of a lactating cow. The system comprises a control unit being configured and operable to determine at least one Milk Solid (MS)-related parameter in at least one milk sample from a lactating cow; and monitor progesterone associated physiological state according to the MS-related parameter.

In some embodiments, the control unit is configured and operable to detect changes in progesterone levels and determine the progesterone-associated physiological state according to the MS-related parameter.

In some embodiments, the control unit is configured and operable to receive size data being indicative of the MS-related parameter.

In some embodiments, the control unit is configured and operable to determine the progesterone-associated physiological state comprises by correlating the MS-related parameter with calibrated data.

In some embodiments, the control unit is configured and operable to correlate the MS-related parameter with the progesterone-associated physiological state of a cow.

In some embodiments, the system further comprises an MS-related measurement module being configured and operable to measure at least one MS-related parameter. In some embodiments, the MS-related parameter in the milk sample is measured using a particle size analyzer. According to some embodiments the particle size analyzer has a single modulator light scattering module. The MS-related measurement module may thus comprise a modulator light scattering module as described above, being configured and operable to measure the MS-related parameter. Alternatively or additionally, the MS-related measurement module comprises an imaging module being configured and operable to collect size data being indicative of MS-related parameters from at least one milk sample.

In some embodiments, the imaging module is configured and operable to collect size data being indicative of MS-related parameters from of a plurality of control lactating cows having known progesterone levels to obtain the calibrated data.

In some embodiments, the MS-related measurement module comprises a dielectric spectroscopy module being configured and operable to measure at least one dielectric parameter of at least one milk sample.

In some embodiments, the control unit is configured and operable to identify a dielectric response of water in at least one milk sample, determine at least one variation of the dielectric pattern of the MS and analyze at least one change in the dielectric pattern including at least one of static dielectric permittivity, a shift and broadening in a main relaxation process peak and appearance of the DC conductivity tail.

In some embodiments, the control unit is configured and operable to monitor the progesterone-associated physiological state of the cow and elicit an alert when the progesterone-associated physiological state of the cow has changed.

In some embodiments, the system further comprises a milk sample withdrawal device being configured and operable to non-invasively collect at least one milk sample. Another embodiment relates to a system for determining the physiological state of a cow. The system comprises: a milk sample withdrawal device, an MS-related measurement apparatus and logic circuitry suitable to correlate the MS measurements with the physiologic state of a cow. In some embodiments the logic circuitry comprises or is associated with data managing and processing apparatus. In some embodiments the data managing and processing apparatus is a computer.

In some embodiments, the control unit is configured and operable to determine the MS-related parameter by using a machine-learning model trained.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 10A-10D illustrate milk yield and solids concentration through the estrus cycle;

FIGS. 23A-23H show the behavior of dielectric parameters (delta epsilon and tau) and biological parameters (SCC, fat, protein, lactose, total solids and MFG) versus time for cow 3941; and;

DETAILED DESCRIPTION OF EMBODIMENTS

Figure 1:
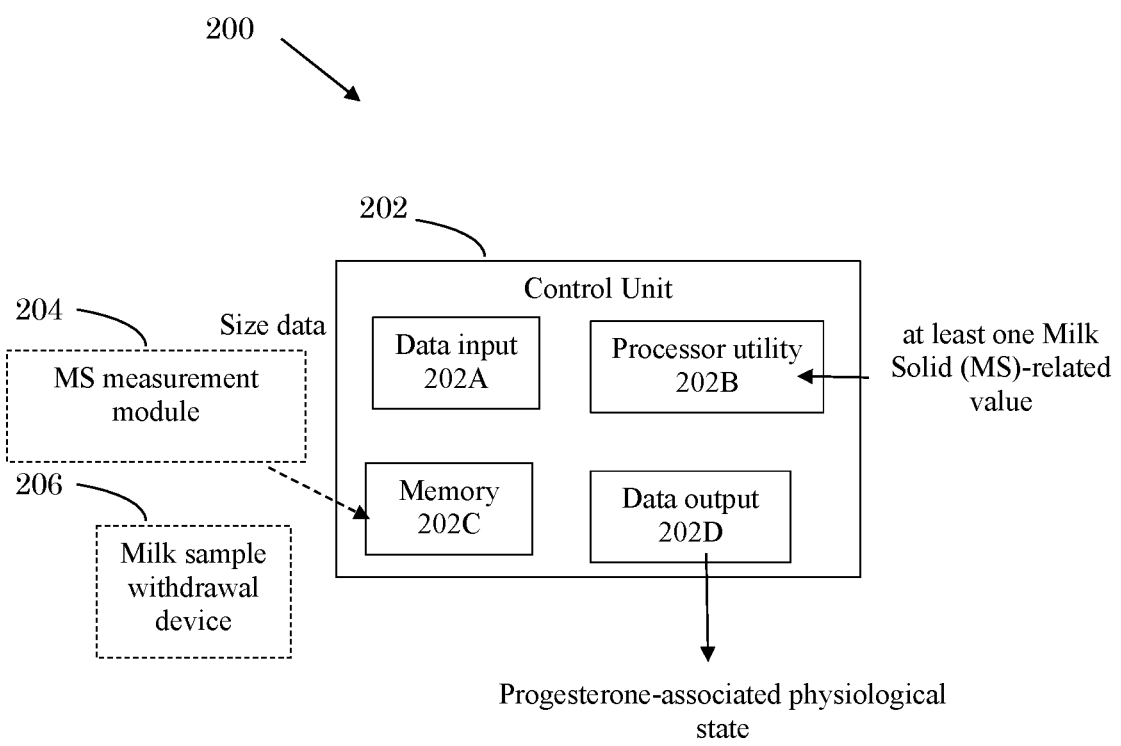
FIG. 1 is a block diagram of a system for determining the progesterone-associated physiological state of a lactating cow according to some embodiments of the present invention.

Reference is made to FIG. 1 illustrating a system 200 for determining the progesterone-associated physiological state of a lactating cow. System 200 comprises a control unit 202 being typically processor-based and including inter alia a memory utility 202C for storage, data input and output utilities (202A and 202D), and a data processor utility 202B. Processor utility 202B is configured and operable for determining at least one MS-related parameter in at least one milk sample from a lactating cow; and determine the progesterone-associated physiological state according to the MS-related parameter. Processor utility 202B may be configured and operable to determine the progesterone-associated physiological state by correlating the MS-related parameter with calibrated data for determining the progesterone level of the cow and to correlate the MS-related parameter with the progesterone-associated physiological state of a cow. In some embodiments, processor utility 202B may be configured and operable to monitor the progesterone-associated physiological state of the cow and elicit an alert when the progesterone-associated physiological state of the cow has changed. In some embodiments, processor utility 202B may be configured and operable to determine the MS-related parameter by using a machine-learning model trained using a set of historical data.

Data input utility 202A may configured and operable for receiving size data being indicative of the MS-related parameter. Data input utility 202A may comprise a communication interface being appropriately configured for connecting the processor utility 202B, via wires or wireless signal transmission (e.g. via communication network(s)), to either a measurement module supplying the data 204 or to an external memory (database) where such data have been previously stored. The communication interface may be a separate utility from processor utility 202B or may be integrated within control unit 202. When the communication interface is a separate unit from control unit 202, control unit 202 may comprise a transceiver permitting to be connected to the communication interface and to transmit and/or receive data. When the communication interface is integrated within control unit 202, it may be included in the data input utility 202A and the data output utility 202D of control unit 202.

The control unit 202 may be configured as an electronic module for collecting and processing data. It should be noted that all required operations may be controlled by means of a processing utility, such as a DSP, microcontroller, FPGA, ASIC, etc., or any other conventional and/or dedicated computing unit/system. The term "processing utility" should be expansively construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices. The processing utility may comprise a general-purpose computer processor, which is programmed in software to carry out the functions described hereinbelow. Also, operations in accordance with the teachings herein may be performed by a computer specially constructed for the desired purposes or by a general-purpose computer specially configured for the desired purpose by a computer program stored in a computer readable storage medium. The different elements of the control unit (electronic unit and/or mechanical unit) are connected to each other by wires or are wireless. The software may be downloaded to the processing utility in electronic form, over a network, for example, or it may alternatively be provided on tangible media, such as optical, magnetic, or electronic memory media. Alternatively or additionally, some or all of the functions of the control unit may be implemented in dedicated hardware, such as a custom or semi-custom integrated circuit, or a programmable digital signal processor (DSP). The terms control unit and processor utility are used herein interchangeably, and furthermore refer to a computer system, state machine, processor, or the like, designed to perform arithmetic or logic operations using logic circuitry that responds to and processes the instructions that drive a computer.

The techniques and system of the present invention can find applicability in a variety of computing or processing environments, such as computer or process-based environments. The techniques may be implemented in a combination of software and hardware. The techniques may be implemented in programs executing on programmable machines such as stationary computers being configured to obtain raw log data, as has also been described above. Program code is applied to the data entered using the input device to perform the techniques described and to generate the output information. The output information can then be applied to one or more output devices.

Each program may be implemented in a high-level procedural or object-oriented programming language to communicate with a processed based system. However, the programs can be implemented in assembly or machine language, if desired.

In other embodiments, the technique of the present invention can be utilized over a network computing system and/or environment. Several computer systems may be coupled together via a network, such as a local area network (LAN), a wide area network (WAN) or the Internet. Each method or technique of the present invention as a whole or a functional step thereof could be thus implemented by a remote network computer or a combination of several. Thus, any functional part of system 200 can be provided or connected via a computer network. In addition, the control unit can also remotely provide processor services over a network.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be implemented as a machine-readable storage medium, configured with a program, where the storage medium so configured causes a machine to operate in a specific and predefined manner.

The determination of the MS-related parameter may be performed by image processing for size data being received by an MS-related measurement module 204. MS-related measurement module 204 is configured and operable to measure at least one MS)-related parameter and to generate size data indicative thereof. MS-related measurement module 204 may be any imaging device such as fluorescence microscope, or modulator light scattering module or a near infra-red scanning device.

MS-related measurement module 204 may comprise an imaging module being configured and operable to collect size data being indicative of MS-related parameters from at least one milk sample. In some embodiments, imaging module may be configured and operable to collect size data being indicative of MS-related parameters from a plurality of control lactating cows having known progesterone levels to obtain the calibrated data.

In some embodiments, MS-related measurement module 204 is associated with a milk sample withdrawal device 206 being configured and operable to non-invasively collect at least one milk sample. In order to initially test whether changes in progesterone level may affect milk fat globule size, the direct effect of progesterone on lipid droplet size was tested in-vitro, using a primary culture of mammary epithelial cells.

Epithelial cells were isolated for mammary biopsies according to the method described in [3]. Cells were incubated for 24 h with 0, 1, 5, and 20 ng/ml progesterone. Cells were then fixed with 4% paraformaldehyde and nucleus and lipid droplets were stained with Dapi and Nile red (Sigma Aldrich, Israel), respectively. Four slides were prepared for each treatment and were visualized with an Olympus BX40 fluorescence microscope equipped with an Olympus DP73 digital camera using CellSens Entry software version 1.7. The lipid droplets of 6-10 cells on each slide were counted and measured using ImageJ software. The experiment was repeated twice.

Figure 2A:
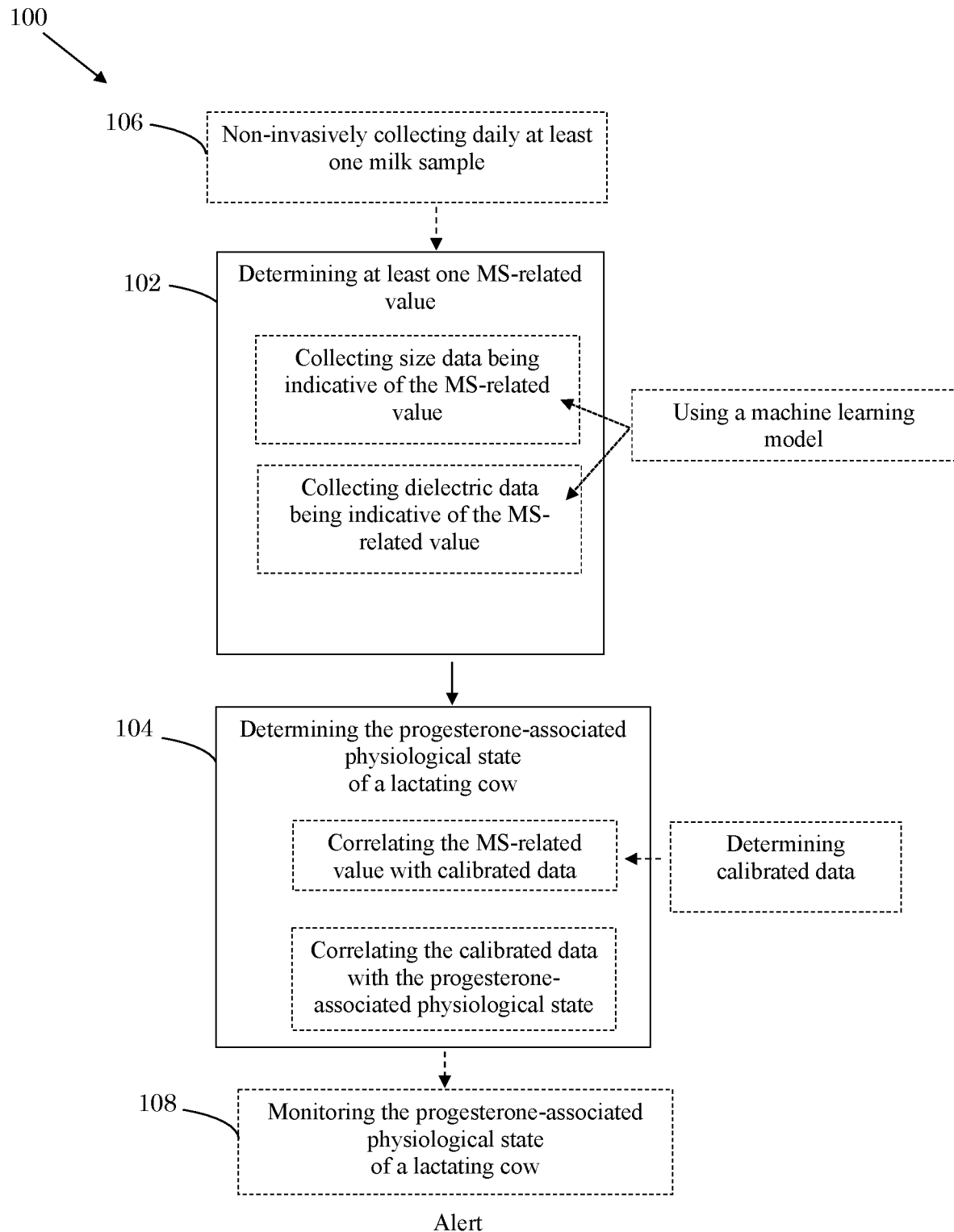
FIG. 2A is a flow chart of a method determining the progesterone-associated physiological state of a lactating cow according to some embodiments of the present invention.

Reference is made to FIG. 2A illustrating a method 100 for determining the progesterone-associated physiological state of a lactating cow. Method 100 comprises in 102 determining at least one MS-related parameter in at least one milk sample from a lactating cow and in 104 determining the progesterone-associated physiological state of a lactating according to the MS-related parameter. Prior to determining the at least one MS-related parameter in 102, method 100 may comprise in 106 non-invasively collecting daily at least one milk sample during the normal milking routine of the lactating cow. Determining the at least one MS-related parameter in 102 may comprise collecting size data being indicative of the MS-related parameter.

For determining the progesterone level of the cow, the MS-related parameter may be correlated with calibrated data. The calibrated data may be obtained by determining MS-related parameters from milk samples of a plurality of control lactating cows having known progesterone levels, the determined progesterone levels are then compared with the known progesterone levels of the lactating cow.

In some embodiments, determining at least one MS-related parameter in 102 may comprise using a machine-learning model trained using a set of historical data.

In some embodiments, method 100 further comprises in 108 monitoring the progesterone-associated physiological state of the cow and optionally eliciting an alert when the progesterone-associated physiological state of the cow has changed.

Figure 2B:
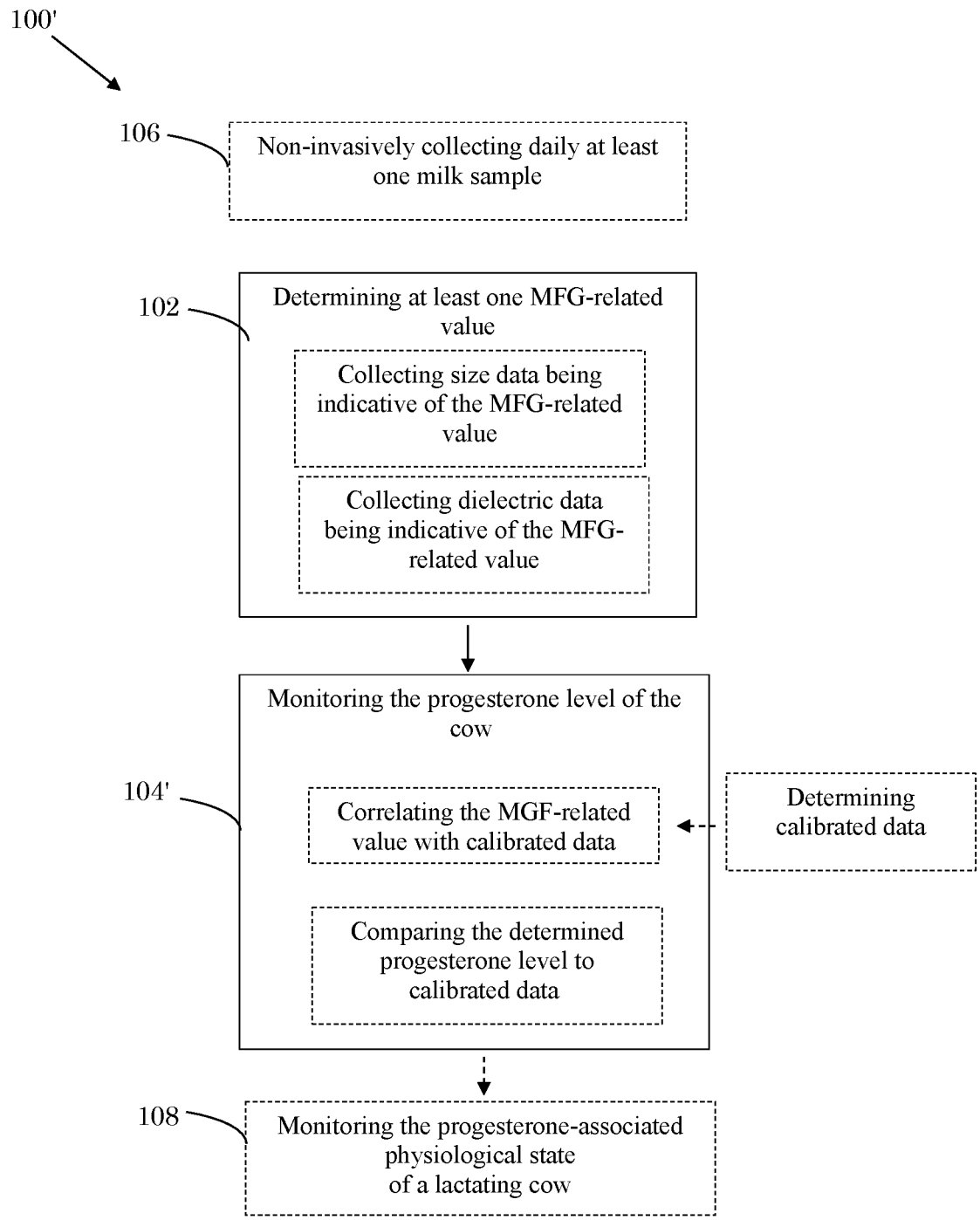
FIG. 2B is a flow chart of a method determining the progesterone-associated physiological state of a lactating cow by monitoring the progesterone level of the cow according to some embodiments of the present invention.

Reference is made to FIG. 2B illustrating a method 100' for determining the progesterone-associated physiological state of a lactating cow. Method 100' comprises in 102 determining at least one MFG-related parameter in at least one milk sample from a lactating according to the MFG-related parameter. Prior to determining the at least one MFG-related parameter in 102, method 100' may comprise in 106 non-invasively collecting daily at least one milk sample during the normal milking routine of the lactating cow. Determining the at least one MFG-related parameter in 102 may comprise collecting size data being indicative of the MFG-related parameter. Method 100' may comprise in 104' monitoring the progesterone level of the cow e.g. by determining changes in progesterone levels and determining the progesterone-associated physiological state according to the MFG-related parameter. For determining the progesterone level of the cow, the MFG-related parameter may be correlated with calibrated data. The calibrated data may be obtained by determining MFG-related parameters from milk samples of a plurality of control lactating cows having known progesterone levels, the determined progesterone levels are then compared with the known progesterone levels of the lactating cow.

Figure 3:
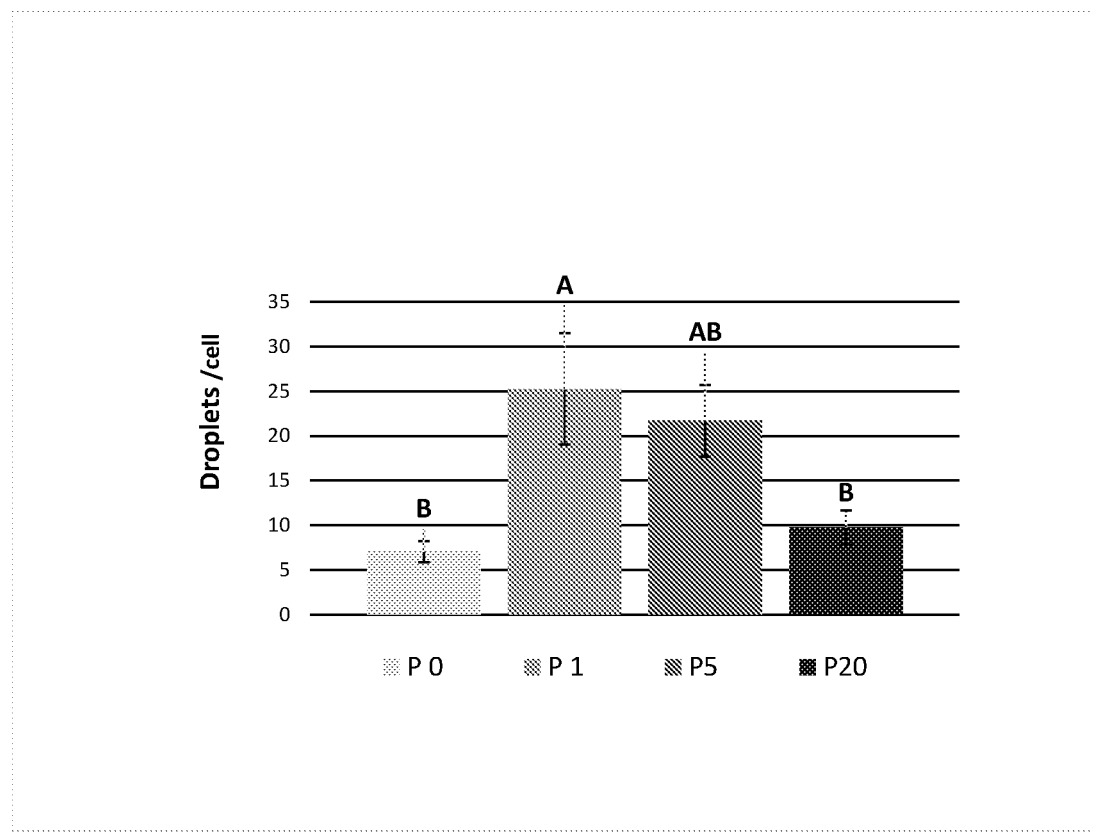
FIG. 3 illustrates the number of droplets larger than 1 µm per cell in mammary epithelial cells treated with 0, 1, 5 or 20 ng/ml progesterone.

FIG. 3 shows a biphasic response of the mammary epithelial cells to progesterone concentrations. Culturing epithelial cells in relatively low progesterone concentrations (1 and 5 ng/ml) resulted in a higher number of large lipid droplets (>1 μm) relative to the control (0 ng/ml progesterone). Culturing epithelial cells with a high progesterone concentration (20 ng/ml) showed that the number of large lipid droplets (>1 μm) was similar to that found in the control.

Figure 4:
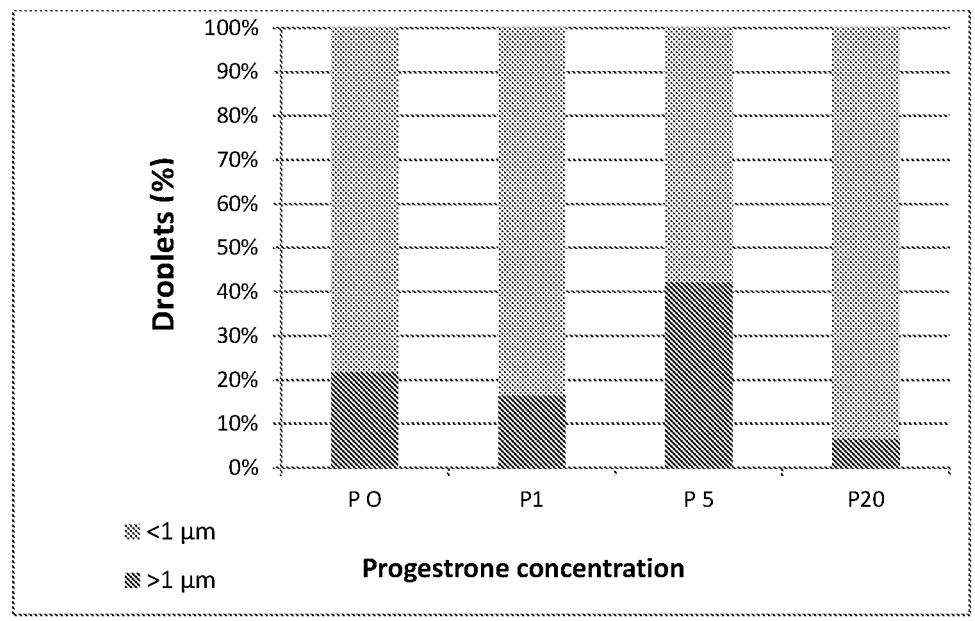
FIG. 4 illustrates the size-distribution of intracellular lipid droplets in mammary epithelial cells treated with 0, 1, 5 or 20 µg/ml progesterone.

The lipid droplets were divided into two groups: $X<1$ μm and $X \geq 1$ μm and the distribution of these groups in the epithelial cells cultured with varying progesterone concentrations was determined. As can be seen in FIG. 4 ($P<0.0001$), the proportion of large lipid droplets was higher when cells were incubated with low and medium progesterone concentrations (1 and 5 ng/ml, respectively) relative to that found when epithelial cells were cultured with high progesterone concentration (20 ng/ml).

These results show that exposing mammary epithelial cells to progesterone affects the size of lipid droplets in a dose response manner.

The effect of progesterone concentration pattern during the estrous cycle on lipid droplet size was also tested. Primary mammary epithelial cells were exposed for 48 h to either increasing (0.75, 2.5 and 5 ng/ml) progesterone concentrations or decreasing (5, 2.5 and 0.75 ng/ml) progesterone concentrations. The concentrations were increased or decreased at specific times to reflect the progesterone pattern during the increasing and decreasing phases of the estrus cycle, i.e. the cells were exposed to increasing concentrations of 0.75, 2.5 and 5 ng/ml progesterone at 0, 17 and 28 h, respectively and cells were exposed to decreasing concentrations of 5, 2.5 and 0.75 ng/ml progesterone at 0, 28 and 34 h, respectively. Cells were then fixed and stained with nile-red. Four slides were prepared for each treatment and lipid droplets were counted and measured under fluorescence microscope. The experiment was repeated twice.

Figure 5:
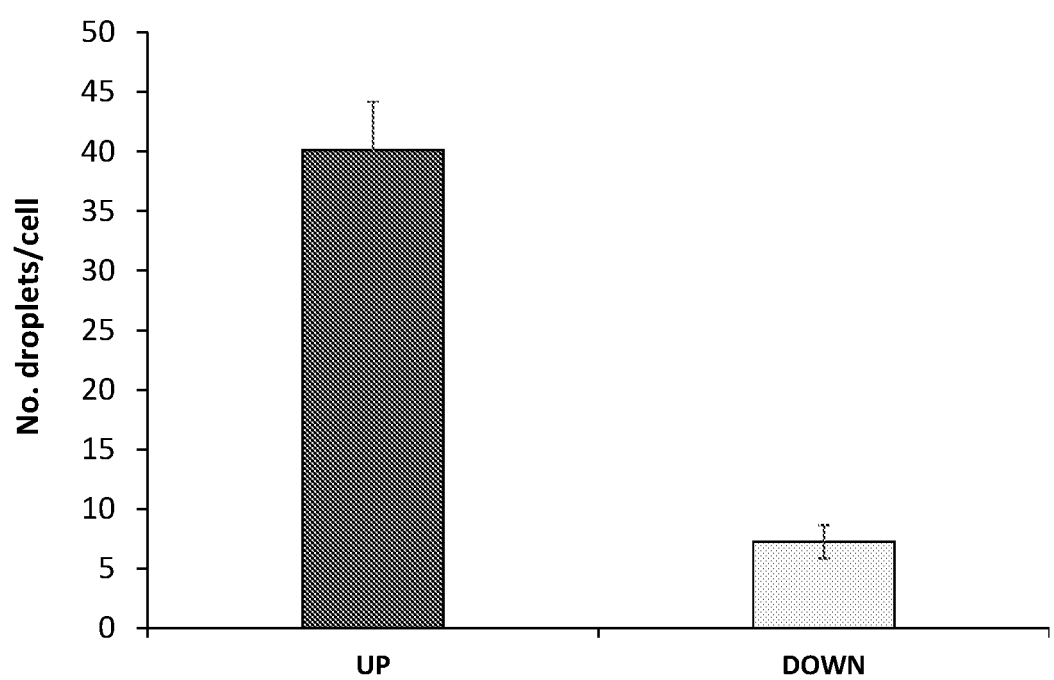
FIG. 5 demonstrates the effect of progesterone concentration pattern on the number of lipid droplets in mammary epithelial cells.

The findings, as shown in FIG. 5, revealed that culturing of mammary epithelial cells with increasing progesterone concentrations (0.75, 2.5 and 5 ng/ml, designated "up") resulted in an increase in the number of lipid droplets by 5.5-fold relative to mammary epithelial cells cultured with decreasing progesterone concentrations (5, 2.5 and 0.75 ng/ml, designated "down") ($P<0.0001$).

Figure 6:
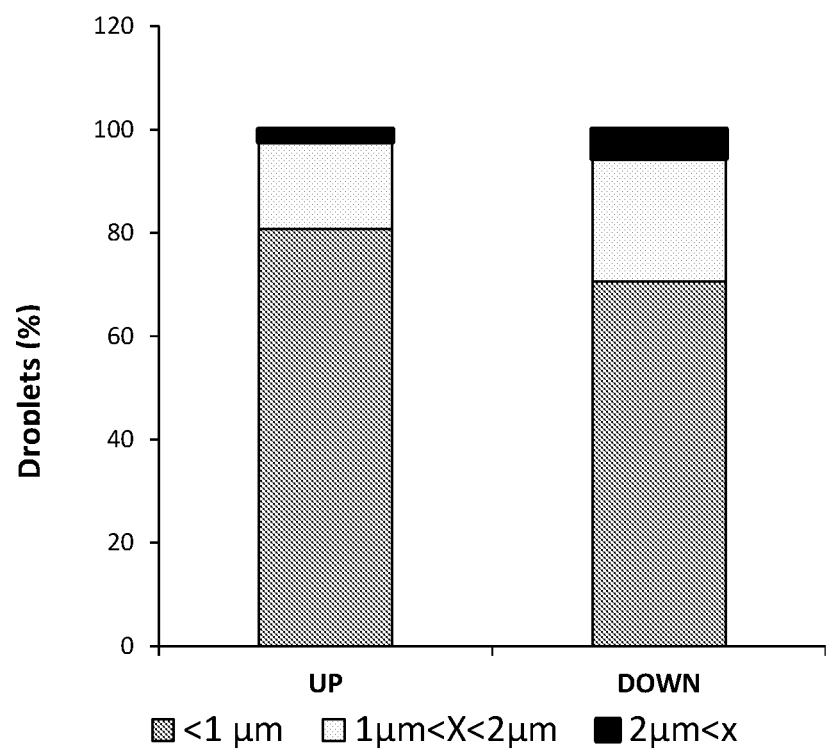
FIG. 6 demonstrates the effect of progesterone concentration pattern on the size-distribution of lipid droplets.

In addition, the proportion of large lipid droplets (>2 μm) of the total number of lipid droplets, was 2-fold higher for cells cultured with decreasing progesterone concentrations (designated "down") as compared to mammary epithelial cells with increasing progesterone concentrations (designated "up"), as shown in FIG. 6 ($P=0.03$).

These results indicated that both progesterone concentration and pattern affect lipid droplet size. Moreover, progesterone concentration can be evaluated through monitoring the structural differences in lipid droplets in milk.

The effect of progesterone on the milk fat globule size in-vivo was also tested. Twelve Holstein cows were synchronized by two PGF2α injections, 14 days apart. Ovulation was determined by ultrasound. Blood and milk samples were collected every other day throughout estrous cycle. The plasma was separated from blood samples and subjected to RIA to determine progesterone concentrations. Milk was fixed using agarose (10% v/v); fat globules were stained with Nile-red, visualized and measured under fluoresce microscopy. Between 100-300 MFGs were measured in each sample.

Figure 7:
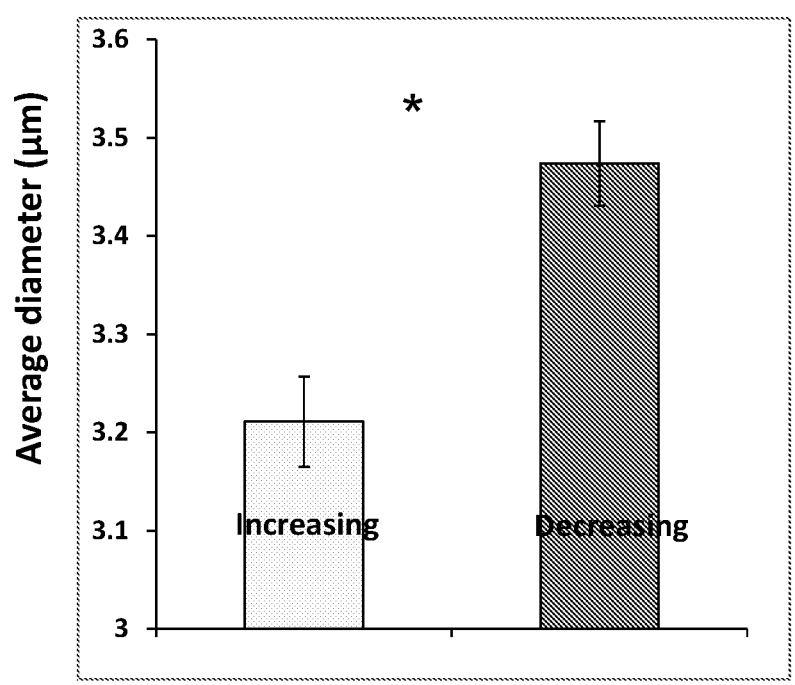
FIG. 7 illustrates how milk fat globule (MFG) size differs in the increased and decreased progesterone phases during estrous cycle of 12 synchronized Holstein cows.

The results show an increase in progesterone concentration from day 2 with highest concentrations on day 13 postestrous. These days were designated as the increasing phase of progesterone ("+" in FIG. 7). From day 14 postestrous onwards, progesterone concentrations decreased, and this phase was designated as the decreasing phase ("–" in FIG. 7). As can be seen in FIG. 7, morphometric analysis of MFG demonstrated that the mean diameter of milk fat globules was 10% larger during the decreasing phase as compared to that recorded during the increasing phase ($P<0.0001$).

Figure 8A:
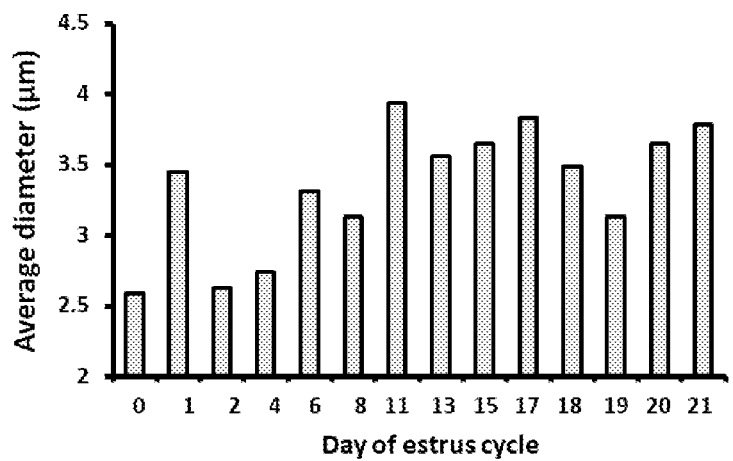
FIGS. 8A-8B illustrate the correlation between MFG size and the daily plasma progesterone concentration measured throughout an entire estrous cycle of a single synchronized Holstein cow.
Figure 8B:
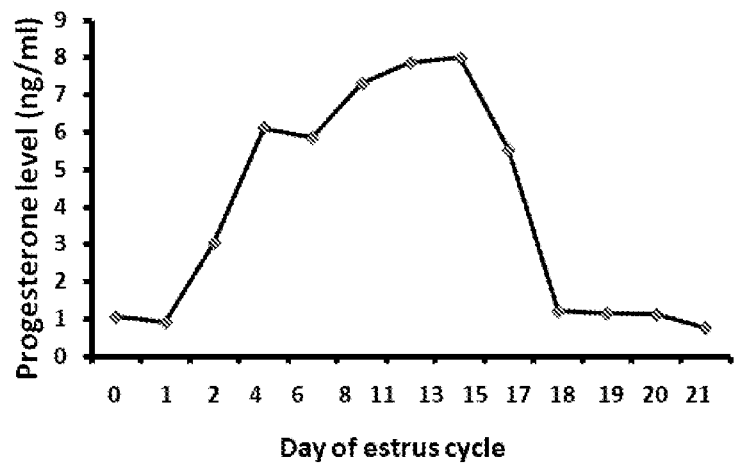

FIGS. 8A-8B show an example of one cow. The MFG size measured throughout an entire estrous cycle is shown in FIG. 8A and the daily progesterone concentration in plasma is shown in FIG. 8B. Through the early luteal phase (days 0 to 8) the increase in progesterone concentration correlates with an increase in MFG size. Through the luteal phase (days 11-15), a marginal increase in progesterone levels with no significant changes in MFG size is observed. In the follicular phase (decreased progesterone level, days 16-18) a reduction in MFG size can is observed. These data express the correlation between MFG size and progesterone levels.

Figure 9:
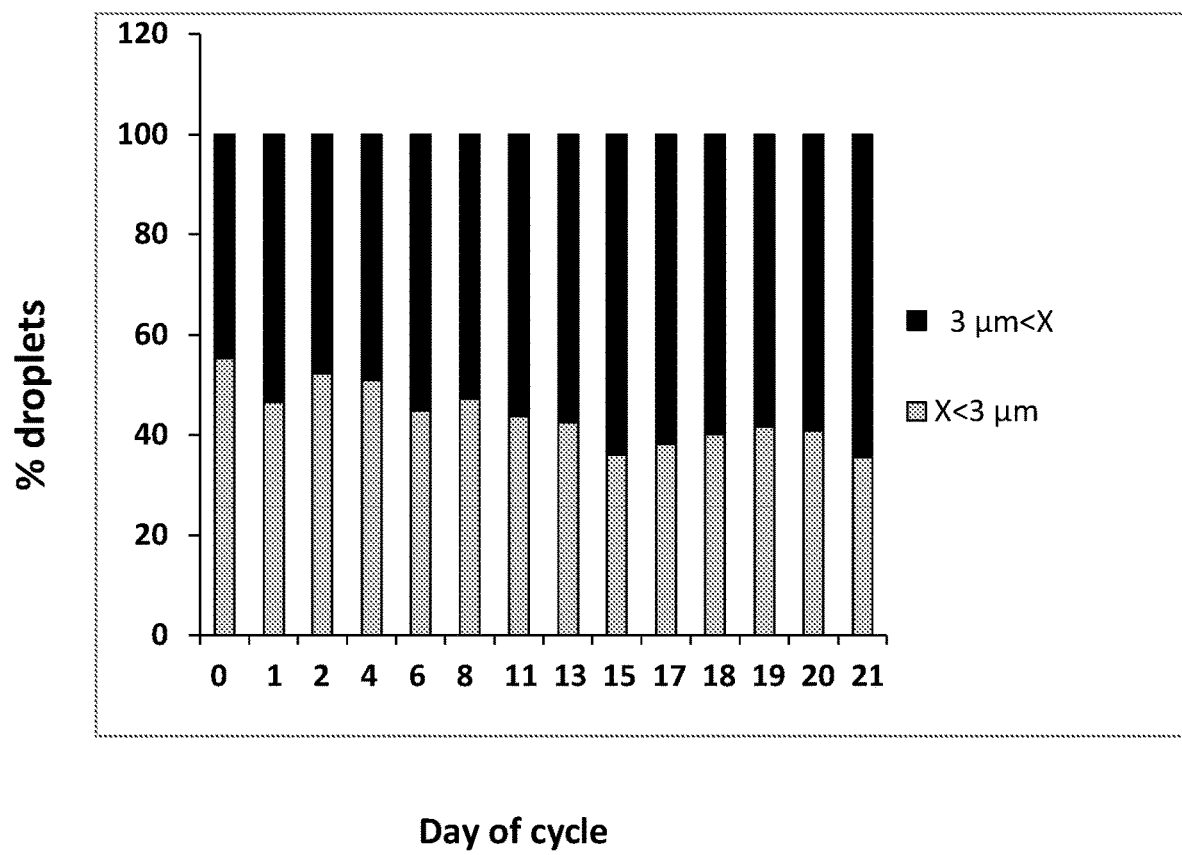
FIG. 9 illustrates the size distribution of milk fat globules throughout estrous cycle of 12 synchronized Holstein cows.

The average size distribution of milk fat globules of 12 samples throughout the estrous cycle is shown in FIG. 9. Milk fat globules size was divided into two groups (>3 μm and <3 μm). The differences in distribution of milk fat globules between the increasing and decreasing progesterone phase was determined by chi-test. The results show that while the majority of the milk fat globules during the increasing phase (days 2-13 postestrous) are smaller than 3 μm, on day 14 post-estrous and onwards, the majority of the milk fat globules are larger than 3 μm ($P<0.0001$).

TABLE 1

| Phase | Y | Prediction Equation | PV |
|---|---|---|---|
| Estrus cycle | Milk fat | 3.719 + 0.08* Progesterone level | P < 0.0001 |
| Increasing phase | (Kg) | 3.677 + 0.022* Progesterone level | P < 0.0001 |
| Decreasing phase | | 3.757 – 0.011*Progesterone level | P < 0.0001 |
| Estrus cycle | MFG | 3.286 + 0.011** Progesterone level | P < 0.0001 |
| Increasing phase | diameter | 3.091 + 0.0292* Progesterone level | P < 0.0001 |
| Decreasing phase | | 3.451 + 0.009* Progesterone level | P < 0.0001 |
| Ovulation day | | 3.39 – 0.66*Progesterone level | P = 0.0351 |
| Estrus cycle | Fat (%) | 1.3809 + 0.0003* Progesterone level | P < 0.0001 |
| Increasing phase | | 1.386 – 0.0017* Progesterone level | P < 0.0001 |
| Decreasing phase | | 1.385 – 0.00004* Progesterone level | P < 0.0001 |

Table 1 shows the results of a correlation analysis between progesterone levels and milk parameters to assess the ability to predict progesterone concentration according to milk fat globule size. The regression between progesterone plasma concentrations and milk fat yield and content (%) and milk fat globule diameter was determined. A significant correlation was found between progesterone and MFG size during the entire cycle, with a much stronger correlation in the increasing progesterone phase. Moreover, the strongest correlation was found on the estrous day (i.e. day 0, determined by pedometric system), expressed by extremely low diameter compared with all the other estrous cycle days.

As described above, the inventors have also performed (1) in-vivo study to examine the association between plasma progesterone concentration and the MFG size in milk. This examination was performed through an entire synchronized estrous cycle; (2) in-vitro model to study the differential effect of progesterone concentration, in particular the changes in MFG size and composition upon exposure to increased progesterone concentration, mimicking the luteal phase, and decreased progesterone concentration, mimicking the follicular phase of the estrus cycle.

MEC were cultured in basic DMEM/F12 medium (Biological Industries, Beit Haemek, Israel) supplemented with hyaluronidase, insulin, hydrocortisone, prolactin, bovine serum albumin, heparin, triolein, oleic acid, progesterone, Nile red, DAPI (Sigma Aldrich Israel Ltd., Rehovot, Israel), collagenase (Worthington Biochemical Corp., Lakewood, NJ), trypsin, fetal bovine serum, streptomycin, amphotericin, glutamine (L-glutamate solution), chloroform, methanol, ethanol, and Trypan blue (Biological Industries). For the lipid analysis, analytical reagent grade petroleum ether (Gadot Lab Supplies, Netanya, Israel), sulfuric acid (H2SO4; Diagnostic Products Corp., Los Angeles, CA), chloroform, methanol and ethanol analytical reagents (Bio-Lab Ltd., Jerusalem, Israel), and dichloromethane and methanol for liquid chromatography (Merk KGaA, Darmstadt, Germany) were used. For the in-vivo experiment, GnRH (Gonadorelin), prostaglandin (PGF2α; Parnell Laboratories, Sydney, Australia), and the Progesterone RIA kit (Medison Pharma, Petach Tikva, Israel) were used.

For the in-vivo study, it was conducted on Holstein dairy cows at the dairy farm of the Agricultural Research Organization's Volcani Center according to the Ethics Committee of the Hebrew University. The selected animals (n=12) were non-pregnant lactating cows, cyclic and healthy, over 100 days in milk. Cows were synchronized according to the "OvSynch" protocol which includes 2 ml intramuscular injection of GnRH analog (day 0), followed by injection of 2.5 ml PGF2α on day 7 and a second injection of 2 ml GnRH 48 h later. The second GnRH injection was defined as day −1 of the synchronized cycle. An additional PGF2α injection was carried out at the end synchronization to confirm ovulation. Follicle and corpus luteum development through the synchronized cycle were recorded by ultrasound monitoring (Aloka, SSD-900, Tokyo, Japan).

Blood and milk samples were collected daily from day 3 pre-estrus to day 2 post-estrus, and from day 17 to day 21 post-estrus. Blood samples were collected from the coccygeal blood vessel into vacuum tubes (Becton Dickinson Systems, Crowley, UK). The plasma was immediately separated by centrifugation for 10 min at 800 g and stored till analysis at −20° C. Plasma was taken to determine progesterone concentration using the Progesterone RIA kit according to the manufacturer's protocol. Cows were milked three times a day and the lactation data, including milk yield, fat, protein and lactose concentrations, were recorded automatically by the Afilab system (Afikim, Israel). Milk samples from the morning milking were stained with Nile red and MFG size was determined (detailed below).

For the in-vitro study, primary culture of MEC was performed according to a protocol established described in [1]. Briefly, mammary tissue was collected from lactating cows in a commercial slaughterhouse and immediately transferred to ice-cold growth medium with 1000 U/ml penicillin, 1 mg/ml streptomycin, 2.5 μg/ml amphotericin mixture, and 0.02 mg/ml heparin. Mammary tissue was digested in medium with 1 mg/ml collagenase, 1 mg/ml hyaluronidase and 0.02 mg/ml heparin, for 3 h at 37° C. After incubation, the suspension was filtered through a metal mesh (250 μm). Sediments were treated with trypsin-EDTA solution and filtered through a 100-μm cell strainer (BD Falcon, Bedford, MA). Then, the cells were grown in plastic culture dishes with DMEM/F12 supplemented with 10% (w-/v) fetal bovine serum, 100 U/ml penicillin, 100 μg/ml streptomycin, 0.25 μg/ml amphotericin B, 1 μg/ml insulin and 0.5 g/ml hydrocortisone. The medium was changed every 48 h.

To examine the effect of progesterone on MFG formation, secretion and size, the culture medium was supplemented with very low-density lipoprotein (VLDL) and progesterone at different concentrations (0, 1, 5 and 20 ng/ml). Progesterone concentrations were based on those found in the plasma during the luteal and follicular phases in vivo. After 24 h, cells were either fixed for lipid droplet size analysis (detailed below (or harvested with trypsin (0.05% w/v), sedimented by centrifugation, and washed with 0.9 gr/L NaCl.

To determine whether the absolute progesterone concentration or its pattern (i.e., increasing or decreasing) affects MFG, cells were treated for 48 h with increasing doses of progesterone: 0.75, 2.5 and 5 ng/ml. The culture medium was replaced after 11, 17, and 20 h, respectively, aimed to mimic the in-vivo luteal phase. The decreasing phase consisted of exposure to 5, 2.5 and 0.75 ng/ml progesterone. Culture medium was replaced after 8, 12 and 28 h, respectively, to mimic the follicular phase.

To determine whether the effect of progesterone on lipid droplet size is mediated by the presence of VLDL, a b-factorial experiment was performed. MEC were cultured with increasing or decreasing progesterone concentrations in the presence or absence of VLDL in the culture medium. This study was aimed to provide indirect evidence of lipoprotein lipase (LPL) activity, acting on VLDL and providing the MEC with exogenous, preformed fatty acids. After 48 h of incubation, cells were fixed and stained with Nile red and intracellular lipid droplet size was determined.

For lipid extraction and analysis, 150,000 MEC were plated in a 60-mm plastic dish. For Nile red fluorescence staining, 50,000 MEC were plated in a 6-well plate on glass cover slips. After 24 h incubation, the culture medium was replaced with DMEM/F12 without serum, containing 0.15% (w/v) free fatty acids-free BSA and insulin (1 μg/ml), hydrocortisone (0.5 μg/ml) and prolactin (1 μg/ml). Cells were incubated for 48 h to induce milk lipid and protein synthesis.

Lipids were extracted by the Folch protocol. Briefly, each cell sample was incubated for 1 h with "Folch mixture" (chloroform:methanol, 1:2 volumetric ratio). The organic phase was separated by addition of double-distilled water (DDW) and overnight incubation at 4° C. The upper phase was then removed, and the lower phase filtered through glass wool. The lower phase was evaporated under nitrogen and then dissolved in chloroform:methanol (3:97). Samples were kept at −20° C. until further analysis.

Lipid separation was performed by thin-layer chromatography and gas chromatography analysis. For the thin-layer chromatography, silica gel was spread on glass plates and activated at 105° C., 24 h before the analysis. After cooling, the cell samples, extracted by Folch protocol, were loaded into the plates along with triglyceride (Tg) and phospholipids (PL) standards. The plates were inserted into a tank with a mixture of petroleum ether, water and acetic acid (8:2:1 volometric ratio) for 30 min, then sprayed with 0.05% v/v dichlorofluorescein in ethanol) and examined under UV light. The detected lipid segments were then separated from the plates into methylation mixture (5% v/v H2SO4 in methanol) for 1 h incubation at 65° C. Then, 1.5 ml petroleum-ether and 3 ml DDW were added to each sample. The upper phase was collected into a new vial and the organic solvent was evaporated with nitrogen. Then 100 μl petroleum-ether was added to each sample for fatty acid analysis in a gas chromatograph model 6890N, equipped with a flame-ionization detector and DB-23 capillary silica (0.25-μm film; Agilent Technology, Wilmington, DE). The analysis was performed according to a protocol established as described in [18]. Peaks were identified with Chemstation software (Agilent Technology). The concentrations of fatty acids are given as molar percentages of the total molar sum of the identified fatty acids. Fatty acids were classified according to chemical characteristics such as double bonds and carbon-chain length.

High-pressure liquid chromatography (HPLC) was performed in an HPLC 1200 (Agilent Technology) equipped with evaporative light-scattering detector. Tg, cholesterol and PL were identified using external standards (Sigma Aldrich). Quantification was performed against external standard curves and expressed as µg/106 live cells or as weight % of the total PL (µg) in the sample. The number of live cells was determined with a hemocytometer after Trypan blue staining.

Cells were grown on glass cover slips, washed three times with phosphate buffered saline (PBS) and fixed with 4% paraformaldehyde in PBS for 20 min at room temperature. Then the cells were washed four times with PBS, stained with Nile red (200 nM) and incubated for 15 min. Cover slips were then washed three times with PBS and stained with DAPI for 5 min. Cover slips were washed four more times with PBS and mounted on a slide with fluorescent mounting medium (Dako North America Inc., Carpinteria, CA). The slides were visualized under an Olympus BX40 fluorescence microscope equipped with an Olympus DP73 digital camera using CellSens Entry software (version 1.7, Olympus). Lipid droplet diameter was measured using ImageJ software (version 1.48, NIH, Bethesda, MD). Lipid droplet diameter was divided into three size categories: small (<1 µm), medium (1 µm<x<2 µm) and large (>2 µm).

Milk samples were stained with Nile red in acetone (42 µg/ml) for 2 h at room temperature. For fixation, agarose was dissolved in DDW (5 mg/ml) and mixed with the milk sample and dye at a 1:20 ratio. The samples were visualized under a fluorescence microscope. Lipid droplet diameter was measured and MFG were characterized individually for each cow and day of estrus. The MFG were divided into two size categories: small (<3 µm) and large (>3 µm).

The statistical procedures were performed using JMP software version 12.0.1 (SAS Institute, Cary, NC). Experimental results were analyzed by one-way ANOVA. All dependent variables were checked for homogeneity variance by unequal variances in JMP software and if the variance was not homogenic, a Welch ANOVA test was performed. Comparisons were made by ANOVA followed by Tukey-Kramer HSD test. The distribution of cell phenotypes based on lipid droplet size categories was compared by chi-square test followed by Fisher's exact test. Significant probability was set to 0.05 and tendencies were reported at $0.05<P\leq0.1$.

For plasma progesterone concentration, milk yield and concentration of fat, protein and lactose in milk, a repeated measures ANOVA was used. Days post-estrus was defined as the covariate. For differences in milk solids and MFG size between increasing and decreasing phases of progesterone concentration during the estrous cycle, the results of progesterone concentration throughout the estrous cycle were plotted for each cow individually. The increasing phase was determined as the period during the estrous cycle in which elevated progesterone concentration was observed, whereas the rest of the estrous cycle was considered the decreasing phase. The distribution of MFG size categories was compared by chi-square test followed by Fisher's exact test. All data are reported as means±SEM. Significance was set at P<0.05.

Cows were synchronized intramuscular injection of GnRH analog. Milk was sampled daily throughout the estrous cycle and analyzed. Reference is made to FIGS. 10A-10D illustrating milk yield and solids concentration through the estrus cycle. The daily values of milk yield and solids concentrations, and the mean values during the increasing- and decreasing progesterone concentration phase throughout the estrous cycle are presented: FIG. 10A shows the milk yield (L/day); FIG. 10B shows the concentration in milk of lactose (%); FIG. 10C shows the concentration of protein (%); and FIG. 10D shows the concentration of fat (%). Neither milk yield nor lactose concentration changed during the estrous cycle. More specifically, no differences were found throughout the estrous cycle in milk yield (P=0.97) or in the concentration of lactose, protein and fat (P=0.79, 0.21 and 0.98, respectively). No differences were observed when the mean values of milk yield and the concentrations of lactose and fat between the increasing and decreasing phase of progesterone concentrations were compared (P=0.71, 0.3, 0.8, respectively). However, protein concentration was lower in the increasing phase of progesterone concentration of the estrous cycle, compared with the decreasing phase (P=0.019). More specifically, milk protein concentration did not change during the estrous cycle, but it was 10% higher in the decreasing vs. increasing phase of progesterone concentration (P=0.02). Accordingly, these parameters did not differ between the increasing and decreasing phases of progesterone concentration as shown in FIGS. 10A-10D).

Figure 11A:
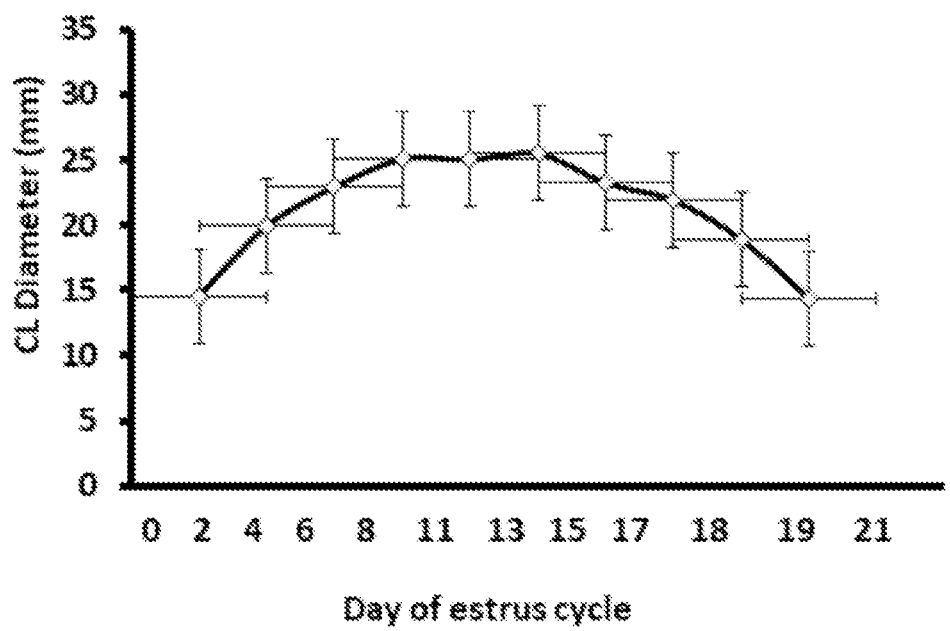
FIGS. 11A-11B illustrate the diameter of the developing corpus *luteum* and the dominant follicles through the estrus cycle.
Figure 11B:
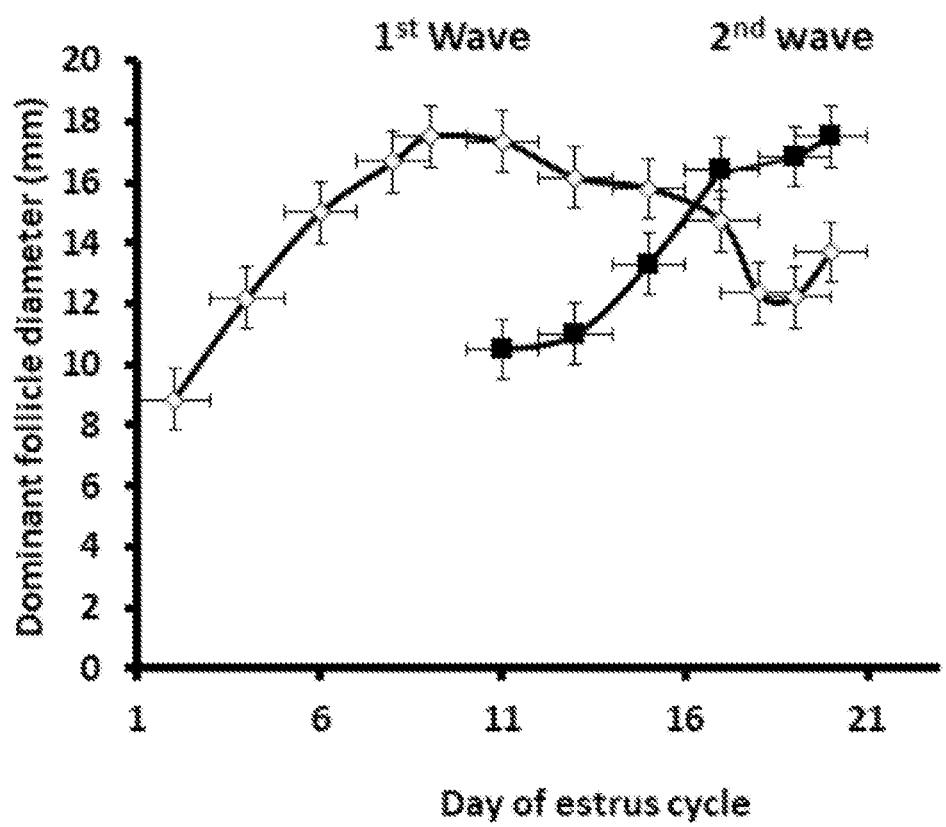

Ultrasonographic scanning indicated a normal pattern of corpus luteum formation and regression. The follicular developmental pattern was normal as well, expressed by two follicular waves and development of dominant and preovulatory follicles in the first and second wave, respectively. Reference is made to FIGS. 11A-11B illustrating the diameter of the developing corpus luteum and the dominant follicles through the estrus cycle. The data displayed as the average diameters measured in dairy cows along the estrus cycle (n=12) of the corpus luteum and largest follicle in the two follicular surges during a normal estrous cycle. More specifically, FIG. 10A shows a daily average diameter of the corpus luteum (CL) along the estrus cycle. FIG. 10B shows an average diameter of the dominant follicles during two subsequent follicular surges during the estrus cycle. Mean diameter of the largest follicle during the first and second follicular surge are represented in white and black, respectively. The values represent mean+SE.

Figure 12:
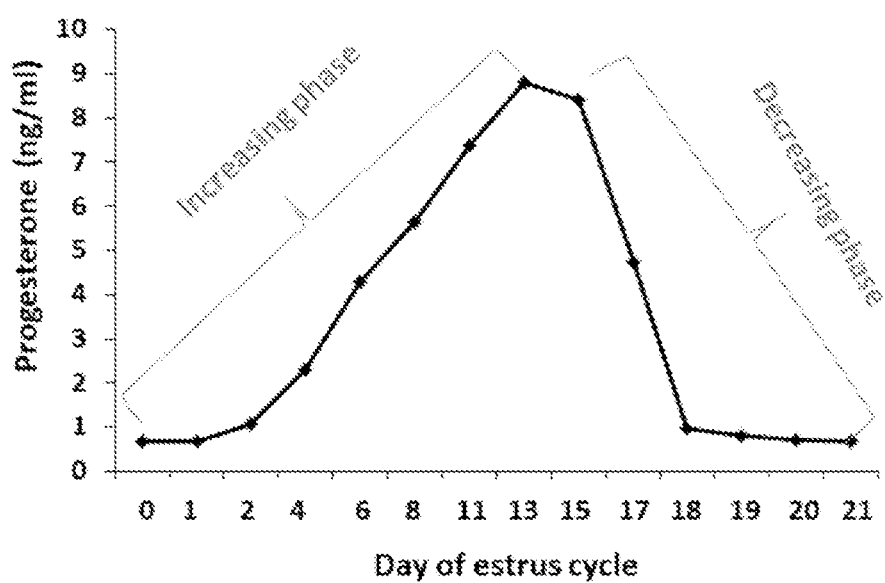
FIG. 12 illustrates daily progesterone concentrations throughout the estrus cycle.

Blood samples were used to determine progesterone concentrations throughout the estrous cycle using radioimmunoassay (RIA). In addition, the progesterone concentrations were used to determine for each cow, individually, the increasing and decreasing progesterone phase. Progesterone concentrations from day 15 to days 20-21 decreased to basal level, defined as the decreasing phase as shown in FIG. 12. Average progesterone concentrations (ng/ml) in daily blood samples of Holstein cows (n=12) were determined during the estrous cycle. The first part of the estrus cycle shows increasing progesterone concentrations (day 0 to 13). A decrease in the progesterone levels was observed from day 16 post ovulation. More specifically, progesterone concentrations from day 0 to 13 of the estrous cycle increased from 0.67 to 8.8 ng/ml, respectively, defined as the increasing phase.

Figure 13A:
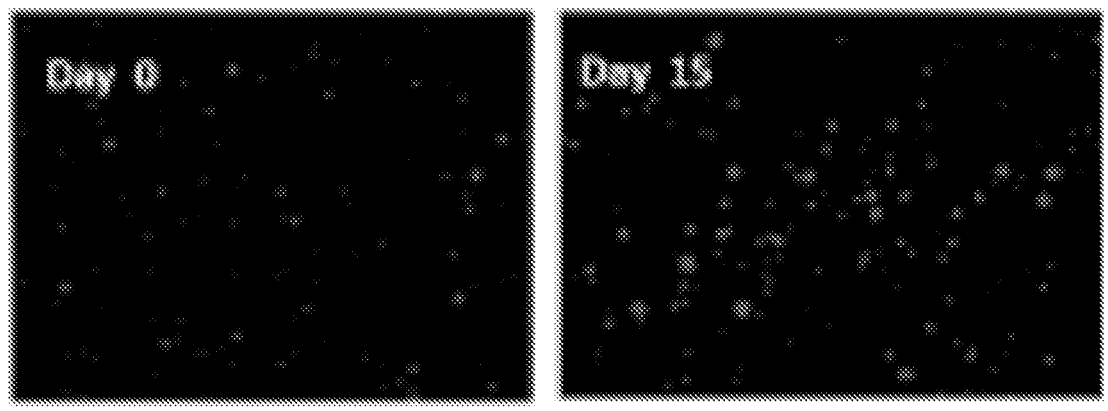
FIGS. 13A-13B illustrate diameter and size distribution of milk fat globules (MFG) throughout the estrus cycle.
Figure 13B:
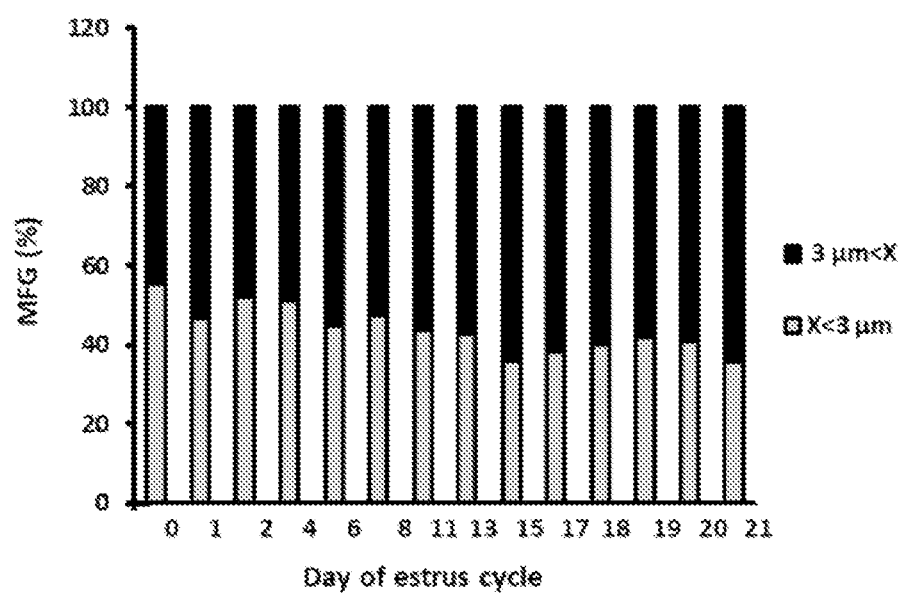

FIGS. 13A-13B illustrate diameter and size distribution of milk fat globules (MFG) throughout the estrus cycle. Milk samples were collected daily throughout the estrus cycle and fat globules stained with Nile red and measured. FIG. 13A shows representative images taken with fluorescence microscope of whole milk, demonstrating the size differences of milk fat globules between the day of ovulation (day 0) and 15-days post ovulation. FIG. 13B shows distribution of MFG size along the estrus cycle. Representative fields (n=3-5) were analyzed for each milk sample collected (n=12) at each day of the cycle. The measured MFG were divided into size categories: small lipid droplets (x<3 µm;

Grey column) and large lipid droplets (x>3 µm; Black column). Differences between size distribution throughout the cycle were measured by Chi test (P<0.05).

Figure 14:
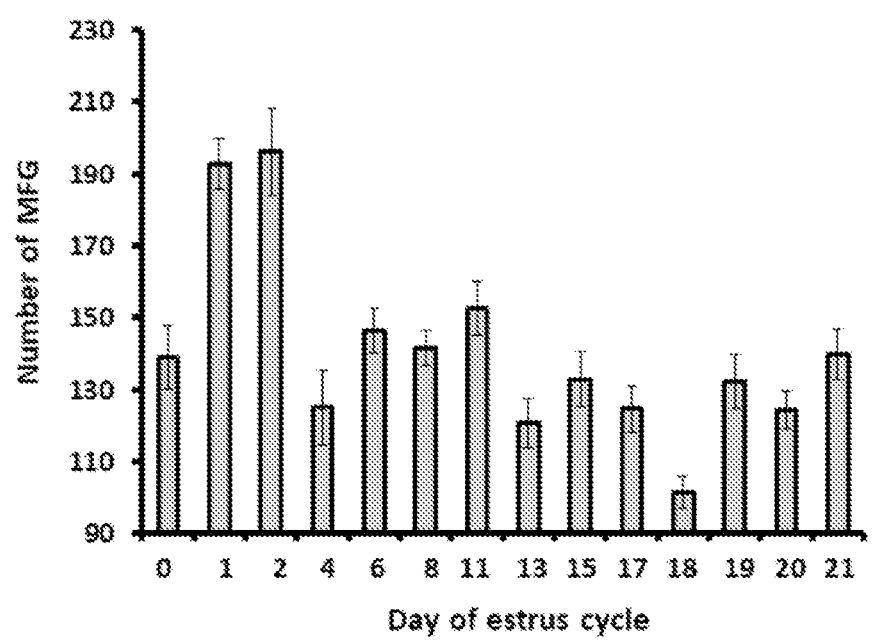
FIG. 14 shows the MFG number throughout the estrus cycle.

Reference is made to FIG. 14 showing the MFG number throughout the estrus cycle. Milk samples were stained with Nile red to enable determine their diameter and number and the milk fat globules (MFG) number were recorded. Five microscopic fields were counted for each sample (i.e., from each cow; n=12). The average MFG diameter changed during the estrous cycle (21 days) from 2.9 to 3.6 µm. The distribution of MFG into large and small globules, based on their diameter, indicated a dominant phenotype of small MFG (<3 µm) through the increasing progesterone phase. On the other hand, the decreasing progesterone phase was associated with a high proportion of large MFG (>3 µm; P<0.0001). Higher number of MFG was observed on day 1 and 2 post ovulation (P<0.0001). Along the estrous cycle, the number of MFG varied between 101 and 196 MFG per sample along the estrus cycle. It should be noted that days 1 and 2 post-ovulation were characterized by a unique and significant increase in the number of MFG as shown in FIG. 14.

Figure 15A:
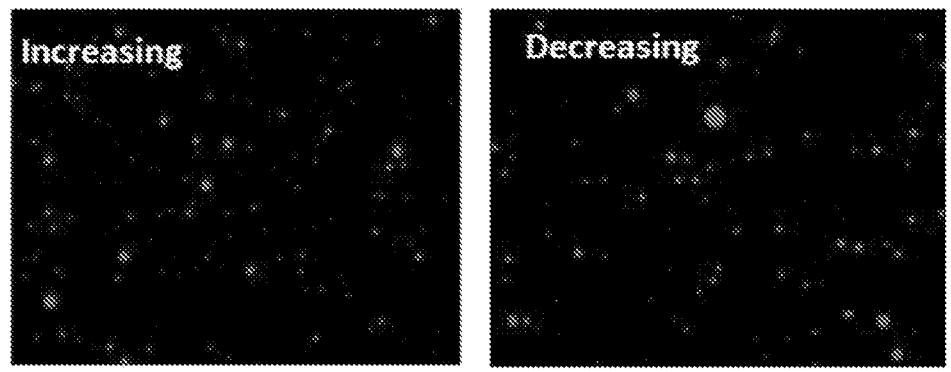
FIGS. 15A-15C show the MFG morphometric traits during the increasing- and decreasing phase of progesterone concentration.
Figure 15B:
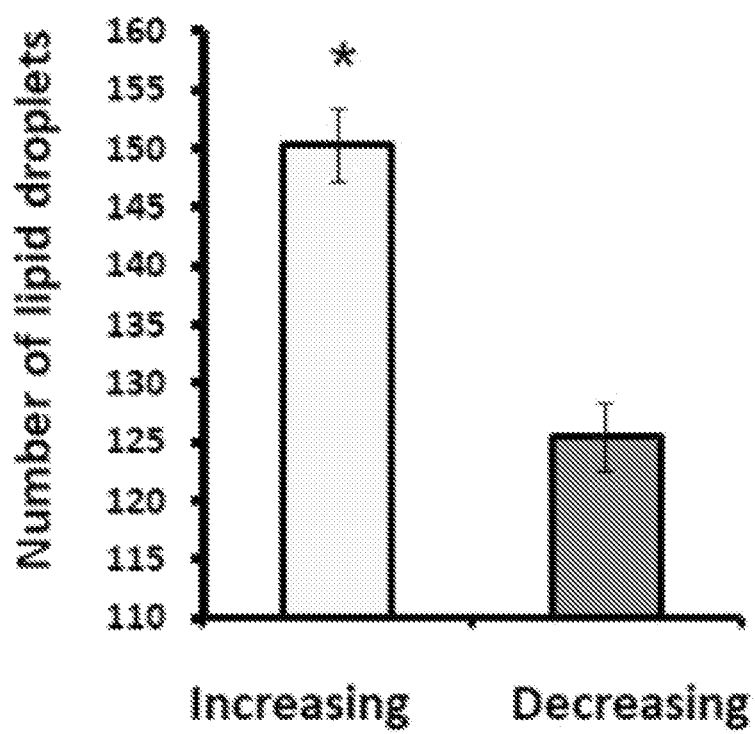
Figure 15C:
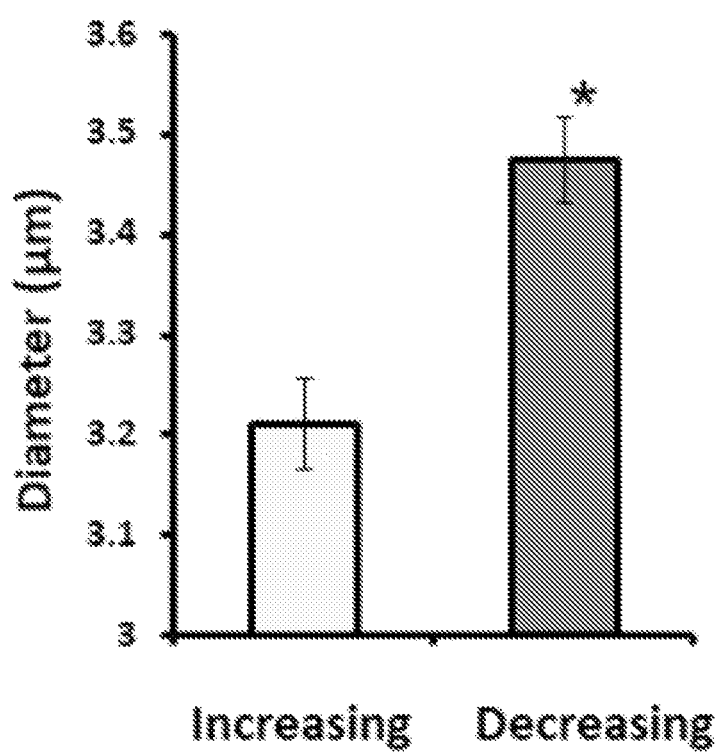

Reference is made to FIGS. 15A-15C, showing the MFG morphometric traits during the increasing and decreasing phase of progesterone concentration. Milk samples were stained with Nile red which incorporates into the MFG and enable their visualization under fluorescence microscope to determine size and number of MFG. FIG. 15A shows representative images of the MFG during the increasing or decreasing progesterone concentration phase through the estrous cycle. FIG. 15B shows the number of MFG droplets during the increasing (white) and decreasing (grey) progesterone concentrations. During the increasing phase, MFG number was elevated by 20% comparing the decreasing phase. FIG. 15B shows the average diameter of the MFG during the increasing (white) and decreasing (grey) of the progesterone concentrations. The average diameter during the increasing phase was lower by 9% relative to that in the decreasing phase. Asterisk represents significant differences, P<0.0001. Therefore, when the estrous cycle was divided into increasing and decreasing progesterone concentration phases, it was found that during the increasing phase, MFG size decreased by 9% compared to that during the decreasing phase.

Figure 16A:
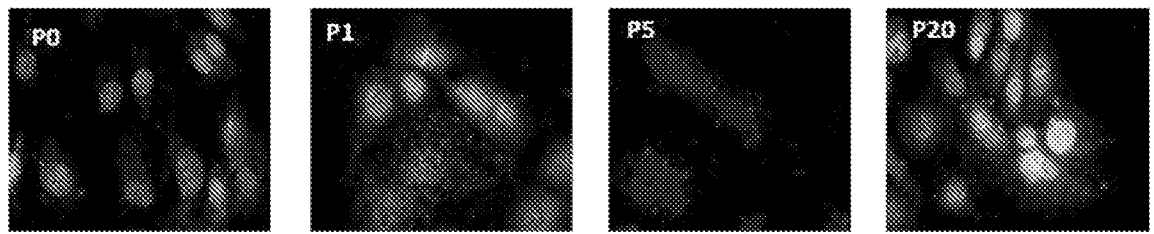
FIGS. 16A-16C show the effect of progesterone on morphometric traits of intracellular lipid droplets in MEC.
Figure 16B:
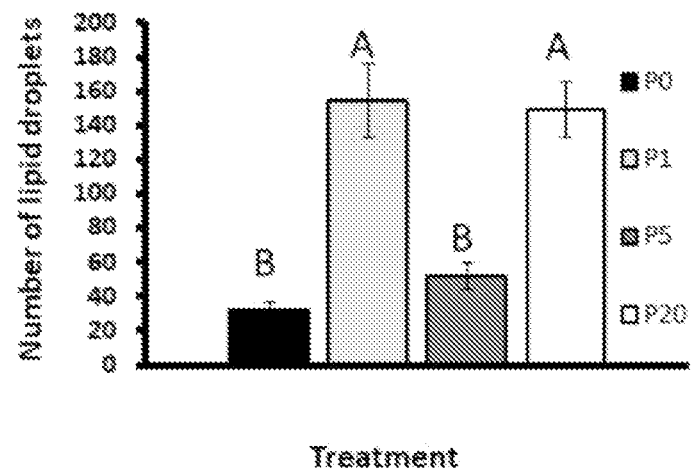
Figure 16C:
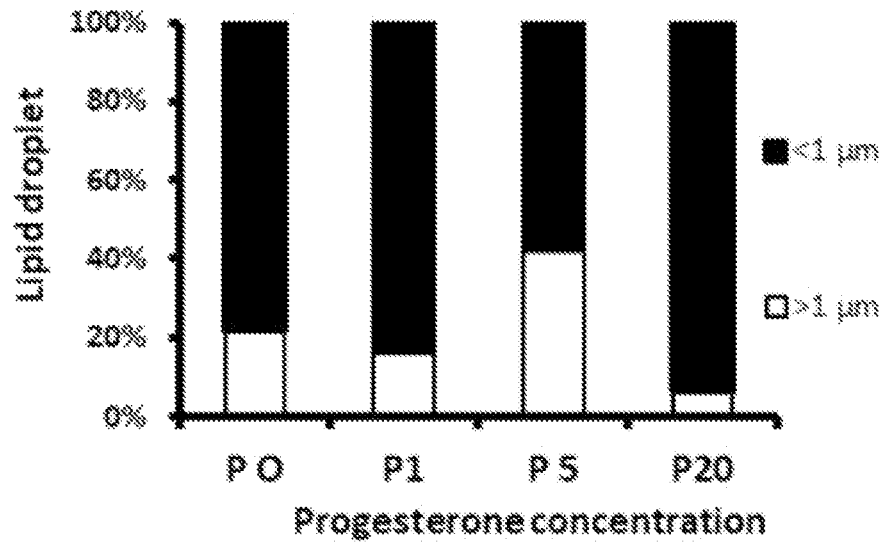

Reference is made to FIGS. 16A-16C showing the effect of progesterone on morphometric traits of intracellular lipid droplets in MEC. Primary culture of MEC was used to determine progesterone effect on the size of the lipid droplets. Lipid droplets were visualized, and size determined prior to their secretion from MEC, and their morphometric traits were used as a proxy for the secreted MFG. To determine the effect of progesterone on lipid droplets, intracellular LD were stained with Nile and the nucleus was stained with DAPI. The number of lipid droplets found in cells treated with 1 or 20 ng/ml progesterone was 3.5-fold higher than in the control (no progesterone; P<0.0001). The number of lipid droplets in cells treated with 5 ng/ml progesterone did not differ from the control. Mammary epithelial cells were treated with progesterone at 0, 1, 5 and 20 ng/ml (P0, P1, and P5& P20, respectively) for 24 h. After incubation, nucleus was stained with DAPI and lipid droplets with Nile. Cells were visualized under fluorescence microscope. The number and size of lipid droplets were recorded. FIG. 16A shows representative pictures of mammary epithelial cells and lipid droplets treated with different progesterone concentrations (Scale bars, 20 µm). FIG. 16B shows the number of lipid droplet per treatment. Data presented as mean±SEM and different letters indicate differences between treatment groups at significant levels of P<0.0001. FIG. 16C shows the distribution of lipid droplet size. Lipid droplets were divided to size categories; small: x<1 µm (black), large: x>1 µm (white). Nine representative fields (10 to 30 cells per field) were analyzed for each replicate (n=3 replicates per treatment). Differences between treatments were determined by Chi square test (P<0.05).

To examine the effect of progesterone on lipid droplet size, MEC were fixed and stained with fluorescent dye. Lipid droplets were divided into two main categories based on their size: large (>1 µm) and small (<1 µm), as previously described in [3] and in FIG. 16C above. The distribution of lipid droplets in the size categories was affected by progesterone (P<0.0001). At 5 ng/ml progesterone, over 40% of the droplets were larger than 1 µm, whereas at 0, 1 or 20 ng/ml progesterone, the proportion of large droplets did not exceed 20%. In particular, culturing cells with 20 ng/ml progesterone resulted in the lowest rate of large droplets, only 6.5%.

Figure 17A:
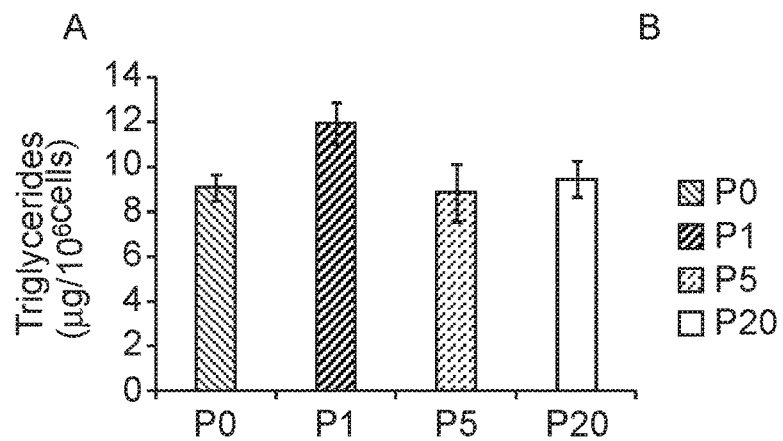
FIGS. 17A-17C show that the progesterone affects lipid content and composition in mammary epithelial cells.
Figure 17B:
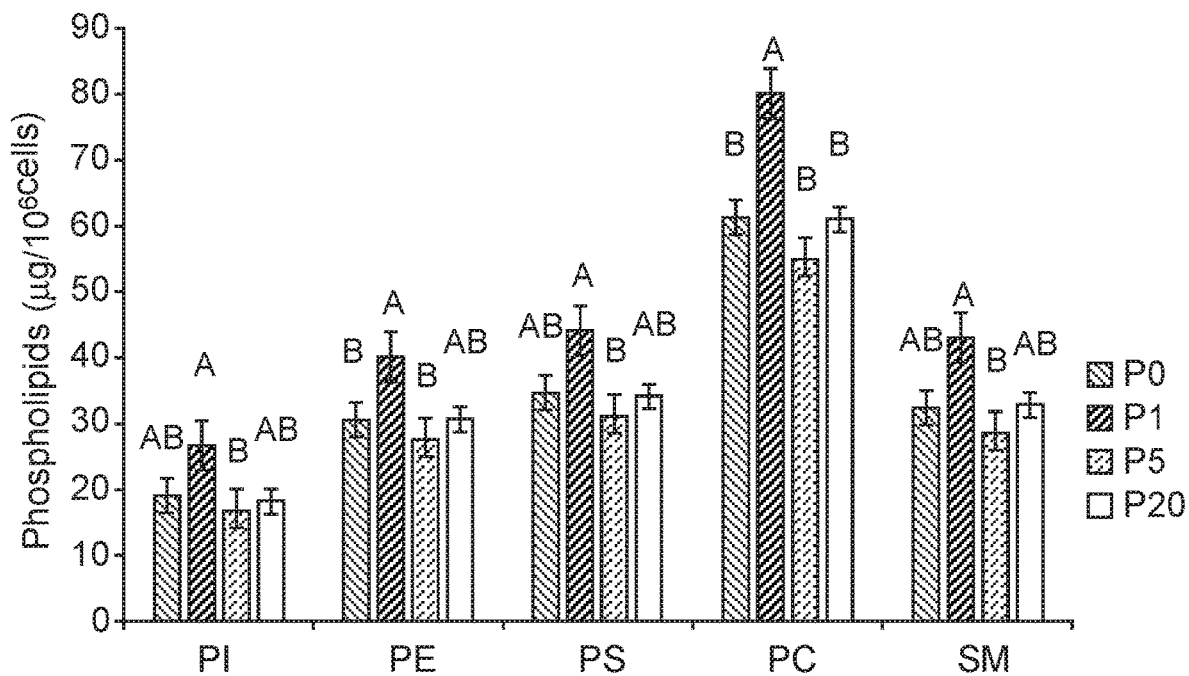
Figure 17C:
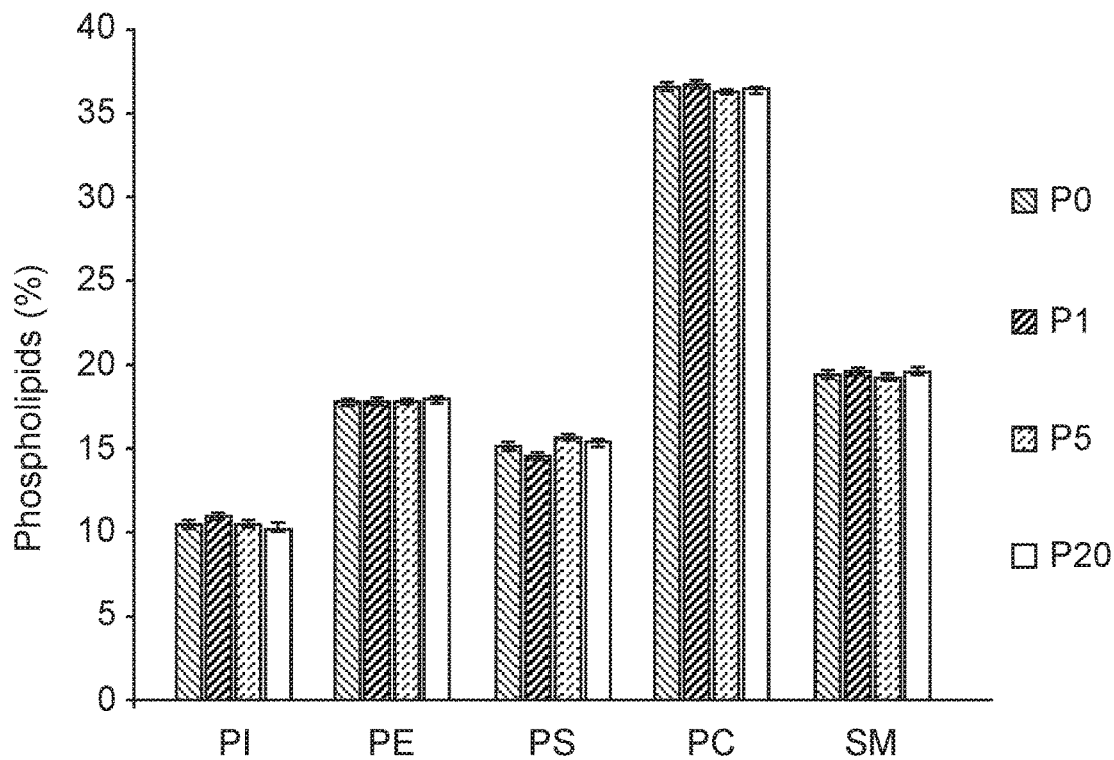

Reference is made to FIGS. 17A-17C showing that the progesterone affects lipid content and composition in mammary epithelial cells. To reveal the potential mechanism by which progesterone affects the number and diameter of lipid droplets, cellular lipids were extracted, and their composition determined. In particular, the composition of the five major membrane PL (PI, PE, PS, PC and SM) was examined. The abbreviations are as follows: Phosphatidylinositol: PI, Phosphatidylethanolamine: PE, Phosphatidylserine: PS, Phosphatidylcholine: PC, Sphingomyelin: SM. Progesterone concentration did not affect the membrane PL composition. Mammary epithelial cells were treated with progesterone at 0, 1, 5 and 20 ng/ml (P0, P1, P5 & P20, respectively) for 24 h. After treatment, cells were harvested, and phospholipid (PL) content and composition was determined by HPLC-ELSD. FIG. 17A shows that the cellular triglyceride content did not differ between treatments. The concentration of Tg was thus not affected by progesterone. It should be noted, however, that incubation of MEC with 1 ng/ml progesterone increased the concentration of the measured PL by approximately 1.3-fold, compared to 0, 5 and 20 ng/ml progesterone (P<0.05). The greatest effect of progesterone was observed on PC, expressed as an elevated concentration—20 µg/106 cells (P<0.05). On the other hand, incubation of MEC with 5 ng/ml progesterone tended to decrease PL amount (P<0.05). FIG. 17B shows that the phospholipid concentration in mammary epithelial cells was determined. Cells treated with 1 ng/ml progesterone had grater PL content while cells treated with 5 ng/ml progesterone had lower phospholipids content relative to the control. FIG. 17C shows that the phospholipids composition (weight %) in the mammary epithelial cells did not differ between treatments. Data are presented as mean+SD. Different letters indicate significant differences in the level of P<0.05.

Figure 18:
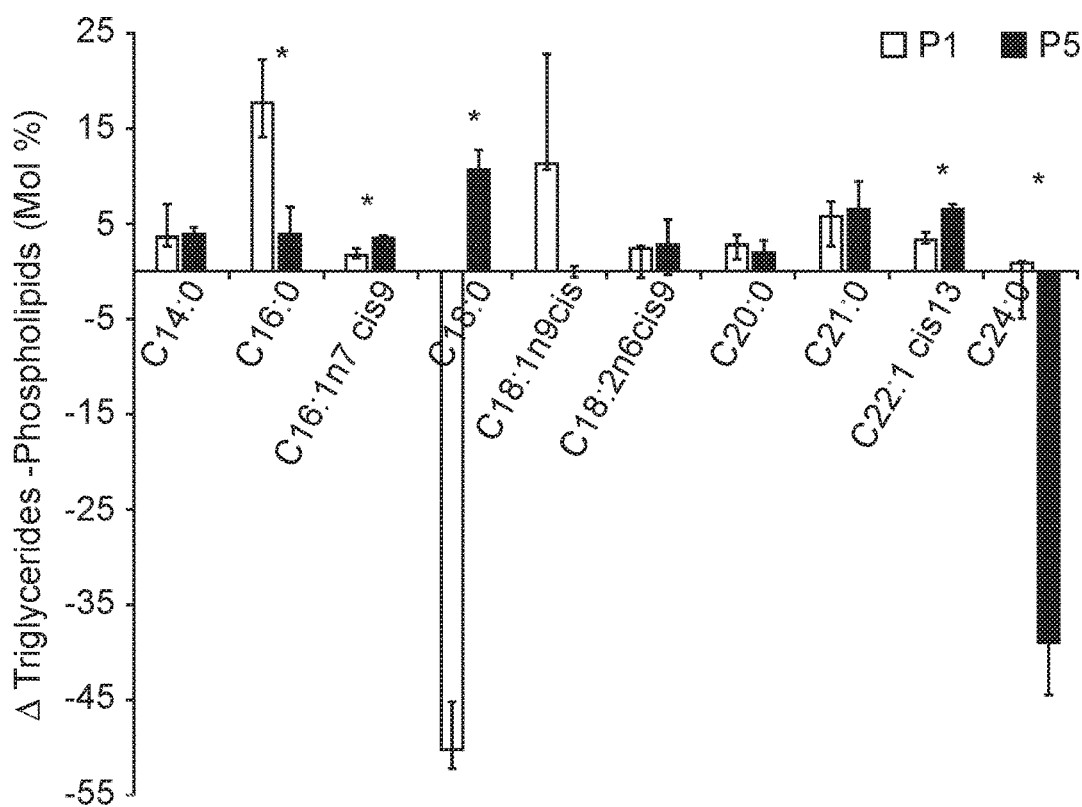
FIG. 18 shows the effect of progesterone on mammary epithelial cells fatty acids profile.

Reference is made to FIG. 18 showing the effect of progesterone on mammary epithelial cells fatty acids profile. Mammary epithelial cells were treated with progesterone at 1 and 5 ng/ml (P1, &P5 respectively) for 24 h. After treatment, cells were harvested, and their fatty acid composition was determined. The concentration of each fatty acids is presented as the delta between its concentration in triglyceride and its concentration in the phospholipids fraction. Positive values indicate greater utilization for fat synthesis (triglyceride) whereas negative values indicate greater utilization for membrane (phospholipid) synthesis. Data are presented as mean+SD. Asterisk indicates significant differences in the level of P<0.05. More specifically, the progesterone concentration pattern was found to be involved in fatty acid utilization for membrane or Tg synthesis. After incubating the cells with 1 or 5 ng/ml progesterone, total fat was extracted and separated to neutral (Tg) and polar lipids. Fatty acid composition in each lipid fraction was determined. The relative fatty acid concentration is demonstrated as the delta between Tg and PL. The concentration of stearic acid (C18:0) was higher in the PL compartment in cells treated with 1 ng/ml progesterone. The concentration of lignoceric acid (C24:0) was higher in the PL compartment in cells treated with 5 ng/ml progesterone (P<0.05).

To examine whether the effect of progesterone is associated with its concentration pattern, MEC were incubated with increasing (0.75, 2.5 and 5 ng/ml) or decreasing (5, 2.5 and 0.75 ng/ml) levels of progesterone, an in-vitro model mimicking the progesterone curve through the estrous cycle in-vivo. Culturing with increasing progesterone concentrations resulted in a 5.7-fold elevation in the number of lipid droplets relative to MEC treated with decreasing progesterone concentrations (P<0.0001). In addition, the distribution of the lipid droplet sizes differed between the two patterns. In particular, increasing progesterone concentration was associated with 3-fold increase in the large lipid droplets compared to the increasing progesterone pattern (P<0.0001; FIG. 10).

Figure 19A:
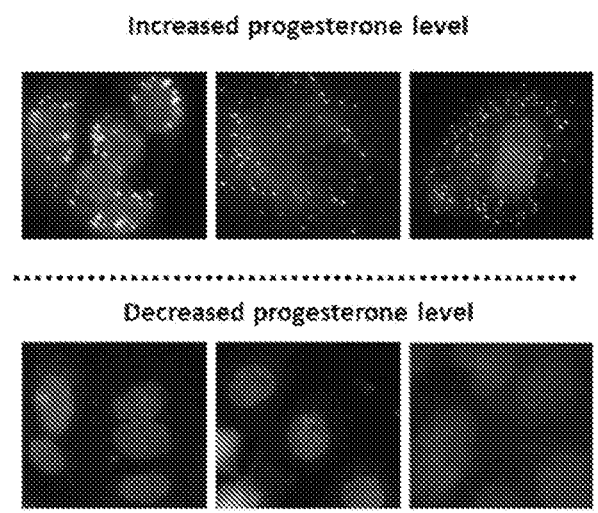
FIG. 19A-19C show incubation of mammary epithelial cells with increasing or decreasing progesterone concentrations changed the intracellular lipid droplets number and size.
Figure 19B:
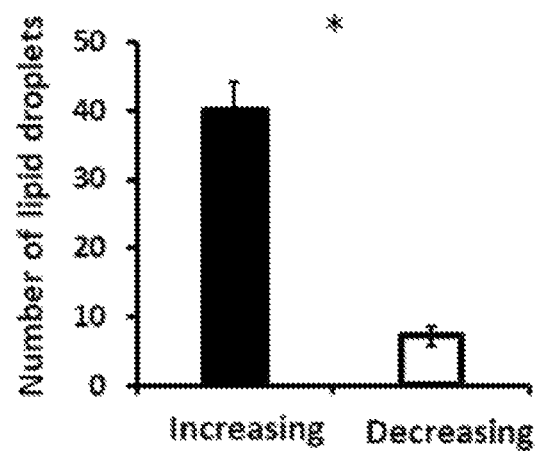
Figure 19C:
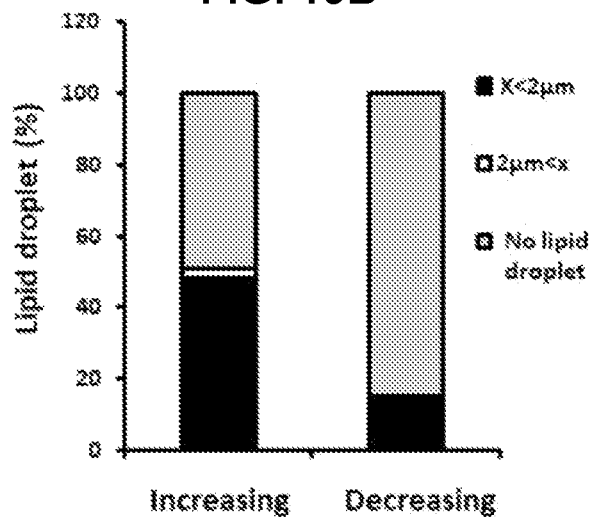

Reference is made to FIG. 19A-19C showing incubation of mammary epithelial cells with increasing or decreasing progesterone concentrations changed the intracellular lipid droplets number and size. Mammary epithelial cells incubated with progesterone either in increasing (0.75, 2.5 & 5 ng/ml) or decreasing (5, 2.5 and 0.75 ng/ml) order. After incubation, nucleus was stained with DAPI and lipid droplets were stained with in Nile red and their number and size recorded. More specifically, FIG. 19A shows a representative figure from increasing and decreasing progesterone concentration treatments. While at the end of the increasing treatment lipid droplets are easily visualized in the cytoplasm of the cells, no lipid droplets can be visualized after the decreasing treatment. FIG. 19B shows the number of lipid droplets after treatments with increasing or decreasing progesterone concentrations. Greater number of lipid droplets was counted in cells treated with increasing progesterone concentrations. The asterisk in FIG. 19B represents a significant difference between the treatments at the level of P<0.0001.

FIG. 19C shows after treatment with increasing or decreasing progesterone concentrations, three phenotypes were examined: cells with large lipid droplets (x>1 μm, black), cells with small lipid droplets (x<1 μm, gray) and cells without lipid droplets (white). Cellular phenotype was designated according to the maximal diameter of its visualized lipid droplets. The large lipid droplet phenotype was only visualized in cells treated with increasing progesterone levels.

Figure 20A:
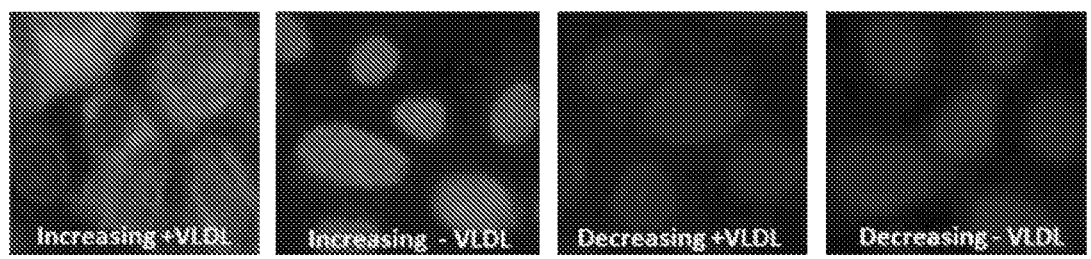
FIGS. 20A-20C show the effect of progesterone on the lipid droplet number is VLDL-depended.
Figure 20B:
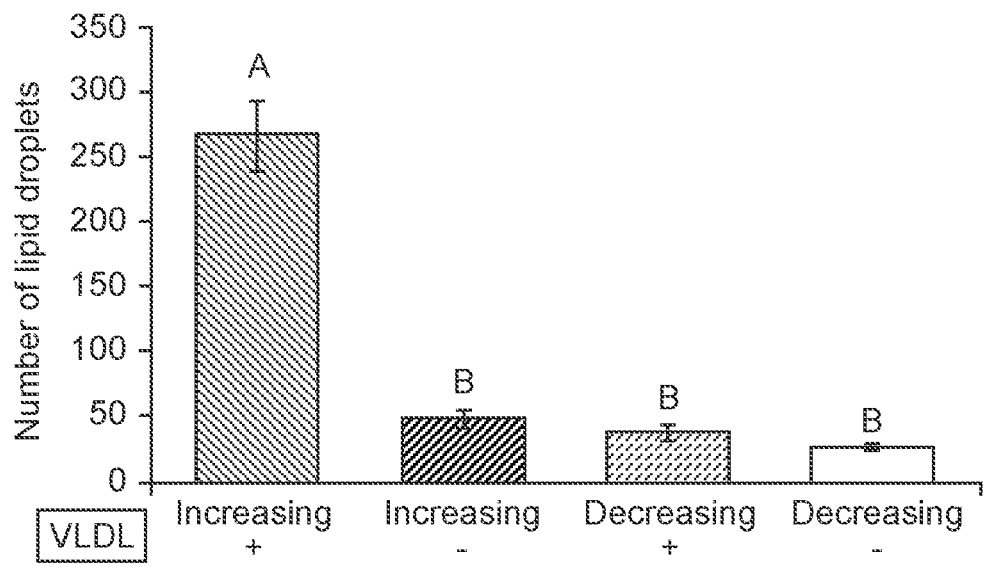
Figure 20C:
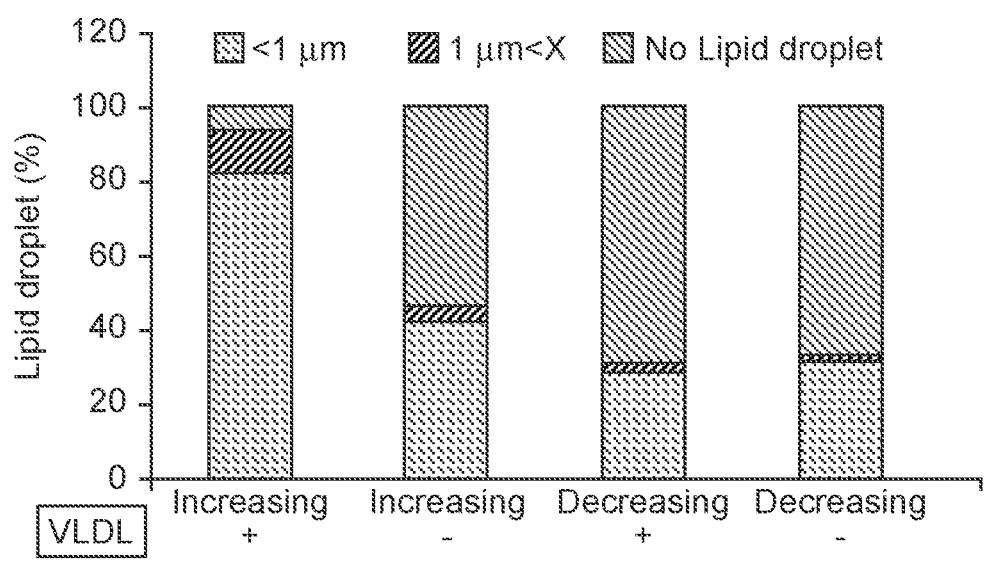
Figure 21A:
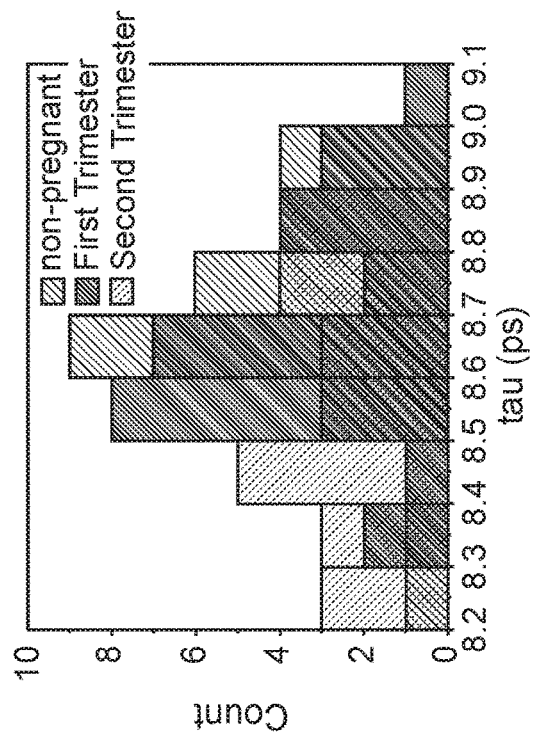
FIGS. 21A-21D are histograms built using the dielectric parameters delta epsilon, tau, alpha and sigma respectively, from non-pregnant cows, first trimester pregnancy and second trimester pregnancy.
Figure 21B:
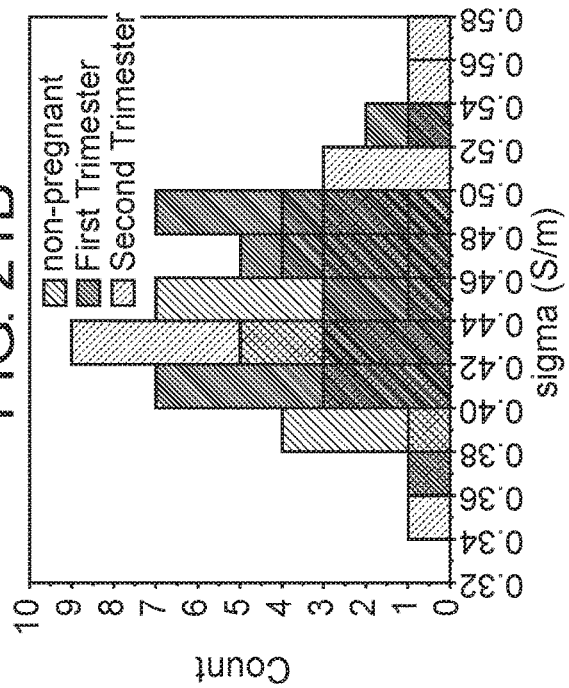
Figure 21C:
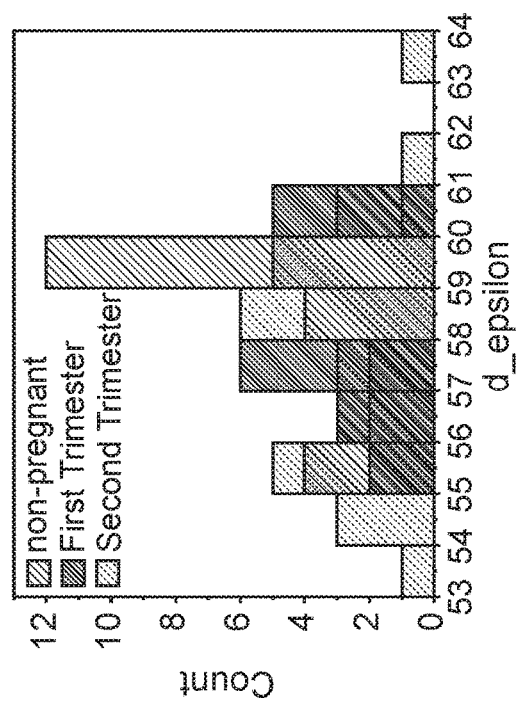
Figure 21D:
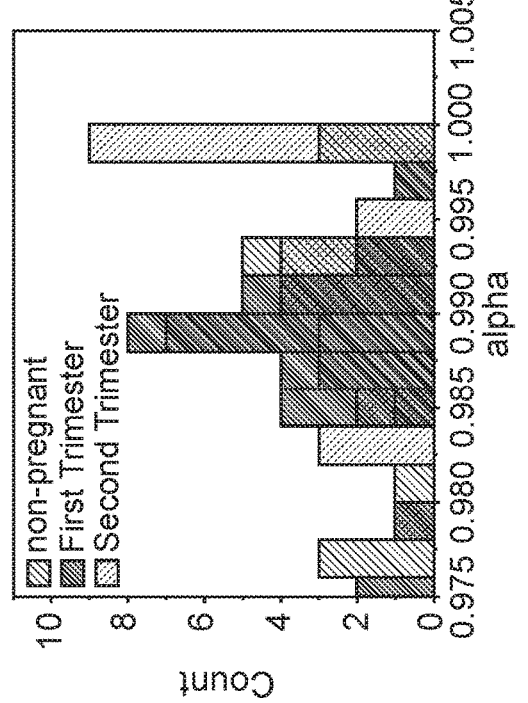

Reference is made to FIGS. 20A-20C showing the effect of progesterone on the lipid droplet number is VLDL-depended. To examine whether findings related to the pattern of progesterone concentration are associated with VLDL, MEC were incubated with increasing or decreasing progesterone levels, in the presence or absence of VLDL in the medium. Mammary epithelial cells (MEC) were incubated with increasing-(0.75, 2.5 & 5 ng/ml) or decreasing (5, 2.5, 0.75 ng/ml) progesterone concentration, with the presence or absence of VLDL. After incubation, nucleus was stained with DAPI and lipid droplets in Nile red. Lipid droplets were counted and measured. The differences in lipid droplet diameter and number were thus found to be VLDL-dependent. In particular, using the increasing progesterone concentration model with VLDL, the proportion of MEC with small lipid droplets increased 2.4-fold. In addition, a 4-fold increase in MEC with large lipid droplets was recorded when cells were incubated with VLDL in the decreasing progesterone concentration model (P<0.0001). On the other hand, in the absence of VLDL, no differences were found between cells incubated with increasing or decreasing progesterone levels. This was true for lipid droplet number and cellular phenotype (P<0.0001). More specifically, FIG. 20A shows a representative figure from increasing and decreasing progesterone concentration treatments with and without VLDL. The most pronounced lipid droplets were found in the increasing progesterone treatment, in the presence of VLDL. Differences between increasing and decreasing treatments were only presented if VLDL was added to the culture medium. FIG. 20B shows the average number of lipid droplets by treatment per field; n=5 fields with 24-50 cells per field and 3 replicates per treatment. Highest number of lipid droplets was recorded when MEC were treated with increasing progesterone concentration and with VLDL. Different letters indicate differences between treatments (P<0.0001). FIG. 20C shows the cells were divided into three phenotypes according to the largest lipid droplet measured: cells with large lipid droplets (x>1 μm, grey), cells with small lipid droplets (x<1 μm, black) and cells without lipid droplets (white). The difference between treatment in the distribution of cells among 3 phenotypes was tested with Chi test. When VLDL was excluded from the culture medium, no differences between cells incubated with increasing or decreasing progesterone levels were found (P+0.0001). Progesterone plays a pivotal role during mammogenesis and serves as an inhibitor of the secretory activation of mammary cells in the last days of gestation. It has been found that progesterone is involved in the regulation of MFG size. Findings from both in-vivo and in-vitro models indicate that the concentration pattern and direction (increasing vs. decreasing), rather than the specific concentration, of plasma progesterone affects MFG size. MFG size changed during the estrous cycle in association with plasma progesterone concentration. Moreover, a comparison of MFG sizes in the luteal and follicular phases revealed a clear association between size and the pattern of plasma progesterone concentration. The proportion of small lipid droplets (<3 μm) was higher in the luteal phase, which is characterized by increasing progesterone concentrations, whereas in the follicular phase, characterized by decreasing progesterone concentration, a high proportion of large lipid droplets (>3 μm) was recorded in milk. A prominent increase in the proportion of small MFG was found on the day of estrus (day 0 of the cycle). This phenotype might be associated with the decrease in progesterone concentration on the previous days, rather than with a direct effect of the basal low progesterone concentration on the day of estrus itself. This assumption is supported by the findings of the in-vitro part of the study.

MFG size is determined prior to its secretion from MEC, during the migration of its precursors, the intracellular lipid droplets, from the site of their synthesis to the site of their secretion, the apical pole of the cell. The initial synthesis and the size regulation of the lipid droplets are common to many of the lipogenic tissues, such as adipose, liver and mammary gland. Several mechanisms have been suggested to control lipid droplet size in MEC, adipocytes and hepatocytes, such as fusion of intracellular lipid droplets [3,14], and the lipogenic capacity of the cell vs. the extent of lipolysis. For example, in 3T3-LI adipocytes, cAMP-induced lipolysis reduced lipid droplet size [19]. Some proteins that might regulate lipolysis and hence lipid droplet size include the lipid droplet-binding protein CGI-58, which activates adipose Tg lipase and hence reduces droplet size [11], and the G0/G1 switch protein (G0S2) and perilipin 5, which inhibit this same lipase and hence increase droplet size [21,22]. Adipophilin may also play a role in size regulation, as mice deficient in adipophilin failed to produce large lipid droplets in their mammary gland. Perilipin A, located on the lipid droplet surface, also restricts the access of lipases, thus increased lipid droplet size. Under fasting conditions, perilipin A is phosphorylated and removed from the lipid droplet, allowing lipases to adhere to the lipid droplet surface and stimulate Tg hydrolysis [13]. Taken together, lipolysis and lipogenesis are mostly regulated by metabolic signals, and largely associated with the total fat content in the cell. Nevertheless, the results of the present invention did not show any direct effect of progesterone on total fat content in milk; therefore, the above-mentioned mechanisms are not likely to cause the differences in MFG size.

Seeking a mechanism by which progesterone regulates MFG size, the inventors assessed whether it affects the distribution of fatty acids between Tg and the membrane of MEC. Interestingly, the distribution of one of the major fatty acids in the cell, stearic acid, was greatly affected by the progesterone treatment. In cells treated with 1 ng/ml progesterone, stearic acid was found primarily in the membrane, whereas in cells treated with 5 ng/ml progesterone, it was mostly incorporated into the Tg. These results are most likely due higher PL synthesis in the 1 ng/ml treatment, in accordance with the PL-quantification data (FIGS. 17A-17C). A higher content of PL may result in the formation of smaller lipid droplets, as smaller droplets require more surface material, provided by the PL [3, 17]. Another interesting aspect of the PL is their composition. PL composition can affect lipid droplet size by regulating its surface stability [3, 4, 9, 20], and hence fusion rates between adjacent droplets, which can contribute to their size. Since progesterone did not affect PL composition, the changes in lipid droplet size observed in the current study are most likely not attributable to fusion between droplets. Taken together, it can be concluded that the differences in lipid droplet size under different progesterone concentrations are due to prioritized utilization of long-chain fatty acids for PL synthesis rather than Tg synthesis in MEC, without changing the total lipogenic capacity or the membrane composition.

It was also found that the differences in lipid droplet diameter and number were VLDL-dependent. In the presence of VLDL, the proportion of MEC with small lipid droplets increased 2.4-fold when cultured with increasing progesterone concentration. In the absence of VLDL, no differences were found between cells incubated with increasing or decreasing progesterone levels. These findings clearly indicate that VLDL are involved in progesterone's mechanism of action. VLDL is one of the sources of long-chain fatty acids for MEC. Long-chain fatty acids are available for MEC from the circulation, either as non-sterified fatty acids originated from adipose lipolysis, or from VLDL, the plasma vehicle responsible for the distribution of dietary fatty acids [15]. Long-chain fatty acids from VLDL are available to MEC either after endocytosis, executed by VLDL receptor, followed by lysosome hydrolysis, or by extracellular hydrolysis executed by membrane LPL [15]. The LPL releases long-chain fatty acids near the basal side of the cell which are consequently taken up by CD36 [7]. Availability of long-chain fatty acids can limit the synthesis capacity of membrane material, and therefore affect lipid droplet size [17]. In the mammary gland, LPL has been shown to be regulated by progesterone [15]. LPL seems to be the biochemical link between progesterone and lipid droplet size, since differences in droplet size were only recorded when VLDL was included in the culture medium.

In summary, findings from both in-vivo and in-vitro models indicate that the pattern and direction (increasing vs. decreasing) of progesterone concentrations to which the MEC are exposed, rather than a specific progesterone concentration, affect MFG size. The findings extend the understanding of the mechanism underlying the regulation of MFG size and provide new evidence of a role for progesterone during lactogenesis.

The following description relates to studies of dielectric properties of raw milk from milking cows.

Milk was collected from specific cows, starting from their non-pregnancy state, passing through insemination and finally after pregnancy confirmation (approximately 42 days postpartum). Every week, 10 samples were collected from morning milking at the Beit Dagan experimental Farm. Milk was collected from the same cows (n=10), weekly, and stored at 4° C. Dielectric measurements are made using a PNA Network Analyzer manufactured by Keysight Technologies, with a slim form open-ended coaxial probe in the frequency range 0.1-50 GHz.

The PNA system consists of a signal source, a receiver and a display. A signal is launched by the source at a single frequency to the material under test (milk). The receiver is tuned to the frequency to detect the reflected and transmitted signals from the material. The measured response produces the magnitude and phase data at that frequency. The source is then stepped one interval to the next frequency and the measurement is repeated to display the reflection measurement response as a function of frequency [26]. In the study the measurements of the reflection coefficient $S11(\omega)$ are related to the complex permittivity $\varepsilon^*(\omega)$ by the equation (2):

$$\varepsilon^*(\omega) = \frac{a(\omega) + b(\omega)S_{11}(\omega)}{1 + c(\omega)S_{11}} \quad (2)$$

The complex parameters $a(\omega)$, $b(\omega)$, and $c(\omega)$, are calculated at a single stage calibration, since the permittivity of the three standards is well known [28].

Additionally, a sample cell for a total volume of ~7.8 mL for the measurements of liquids is used. Temperature is controlled using a thermal jacket that is attached to a Julabo Cryo-Compact heat circulatory system. The whole measurement system is maintained at 25±1° C. Each sample is measured 3-4 times.

Milk samples were transported to the lab at the same day of collection at 4° C. At the lab, milk was stained with Nile red in acetone (42 µg/ml) for 2 h at room temperature. For fixation, agarose was dissolved in DDW (5 mg/ml) and mixed with the milk sample and dye at a 1:20 ratio. The samples were visualized under a fluorescence microscope. Images were analyzed by ImageJ software to determine mean MFG size.

The composition of milk solids, including fat, protein, lactose was determined in fresh milk samples, at the same day of collection, using a near infra-red scanning device (Lactoscan, MRC).

Data from, both labs were combined and used to determine the dynamic changes of milk and bulk water in milk through the estrous cycle, insemination and pregnancy.

Data extracted from dielectric spectra of milk from random pregnant and non-pregnant cows was used to investigate the possible repercussions that pregnancy state could cause on dielectric water response. Such effects are tracked using the dielectric parameters: delta epsilon, tau, alpha and conductivity A consecutive sampling of individual cows was performed in order to investigate the milk properties (MFG size, concentration of lactose, protein and fat) as well as dielectric properties of bulk water in milk. Samples were obtained before and after insemination, until pregnancy diagnostic.

FIGS. 21A-21D show a superposition between the data from the three groups: non-pregnant cows, first trimester pregnancy and second trimester pregnancy built using the dielectric parameters (delta epsilon, tau, alpha and sigma).

FIGS. 22A-22H show the behavior of dielectric parameters and biological parameters versus time for cow 3724. FIGS. 23A-23H show the behavior of dielectric parameters and biological parameters versus time for cow No. 3941. The features that have been included are the most sensitive dielectric parameters (dielectric strength-delta epsilon and relaxation time-tau) and biological parameters (SCC, Fat, Protein, Lactose, total solids-sum of fat, proteins and lactose contents-MFG average diameter). For pregnant cows, the control unit have determined a correlation between biological and dielectric parameters. High variations in total solids and MFG are reflected in the high variability of delta epsilon and tau. Interestingly, for pregnant cows, a reduction of variability of delta epsilon and/or tau can be observed during the first weeks immediately after insemination. Such behavior was not noticeable in the case of non-pregnant cows.

Figure 22A:
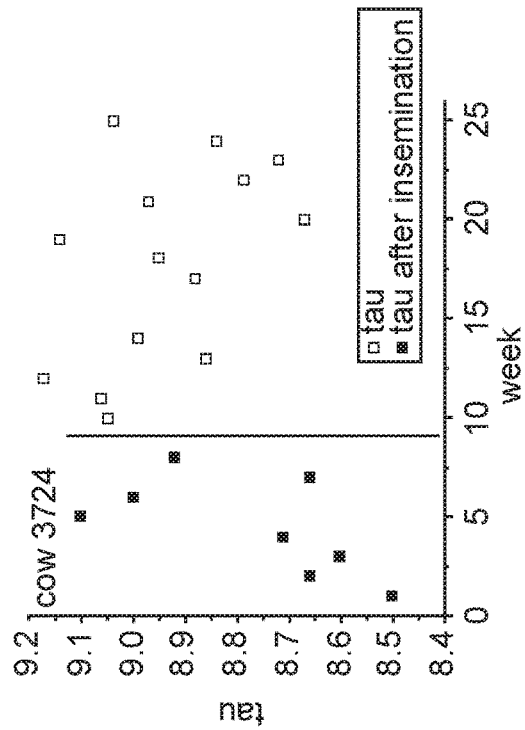
FIGS. 22A-22H show the behavior of dielectric parameters (delta epsilon and tau) and biological parameters (SCC, fat, protein, lactose, total solids and MFG) versus time for cow 3724.
Figure 22B:
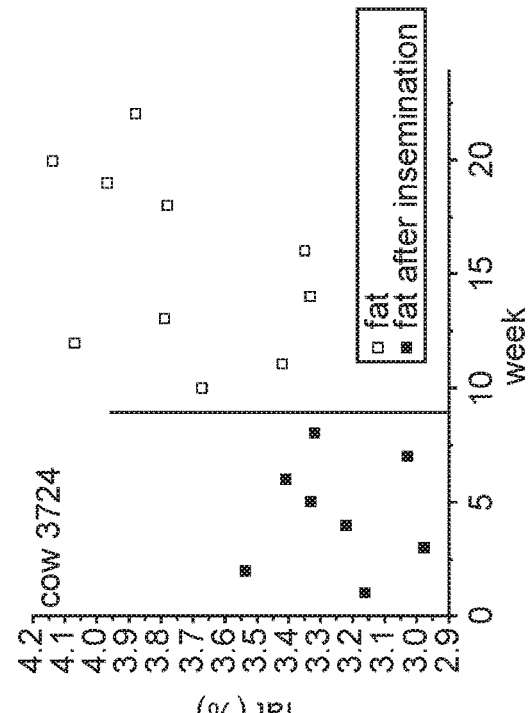
Figure 22C:
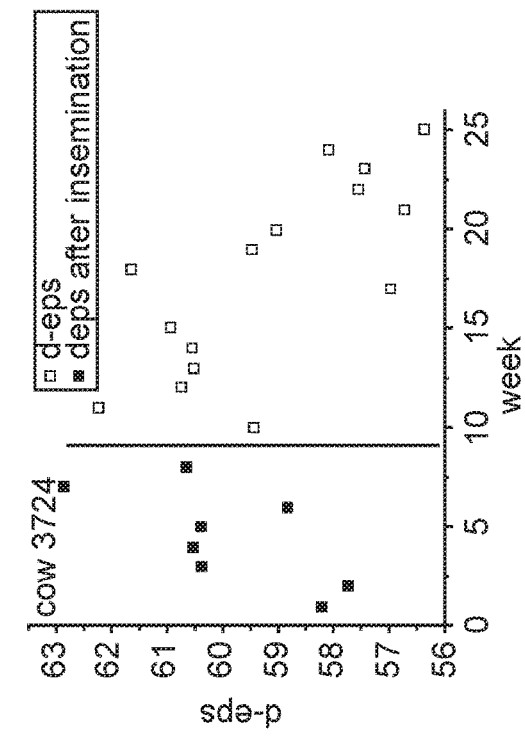
Figure 22D:
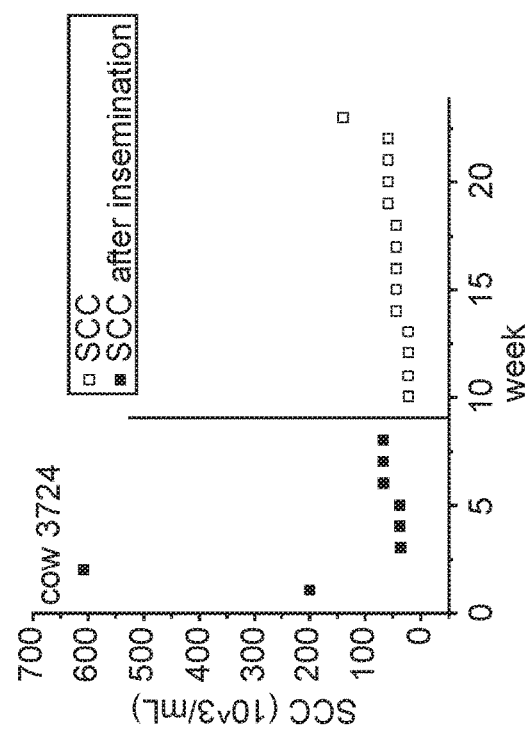
Figure 22E:
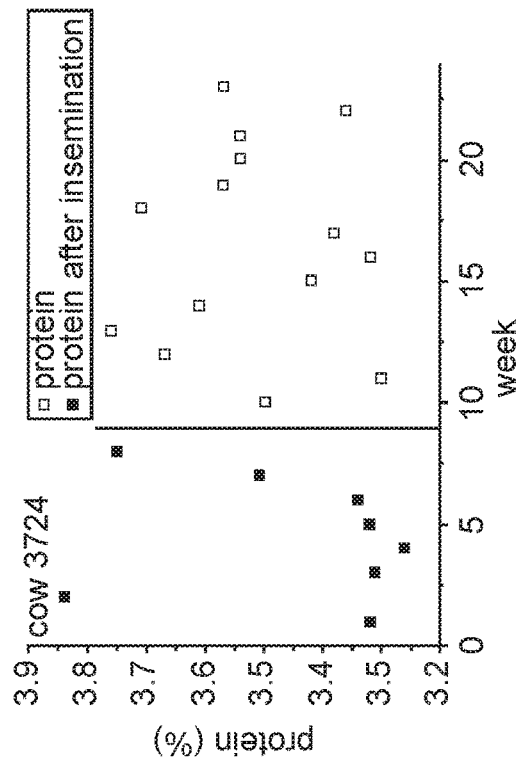
Figure 22F:
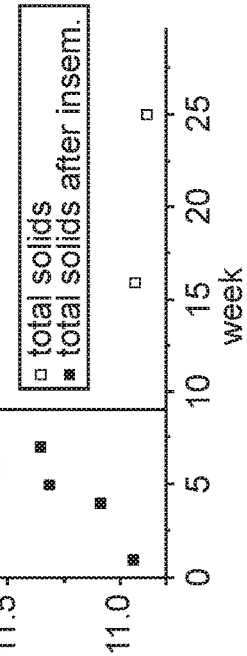
Figure 22G:
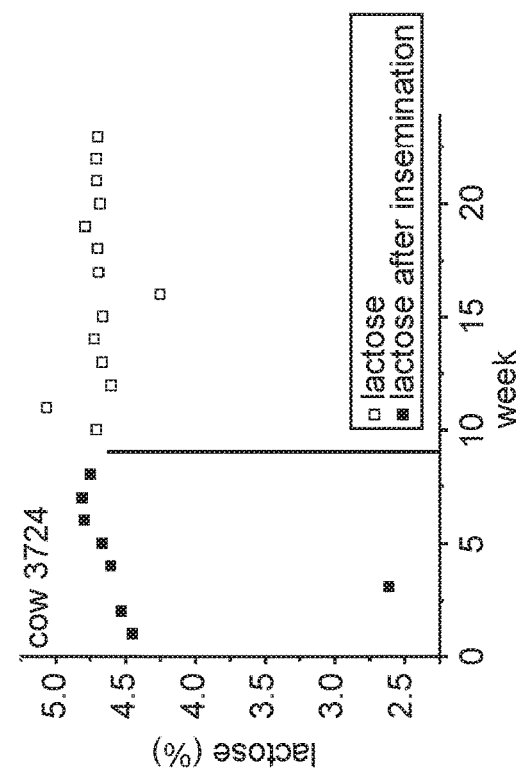
Figure 22H:
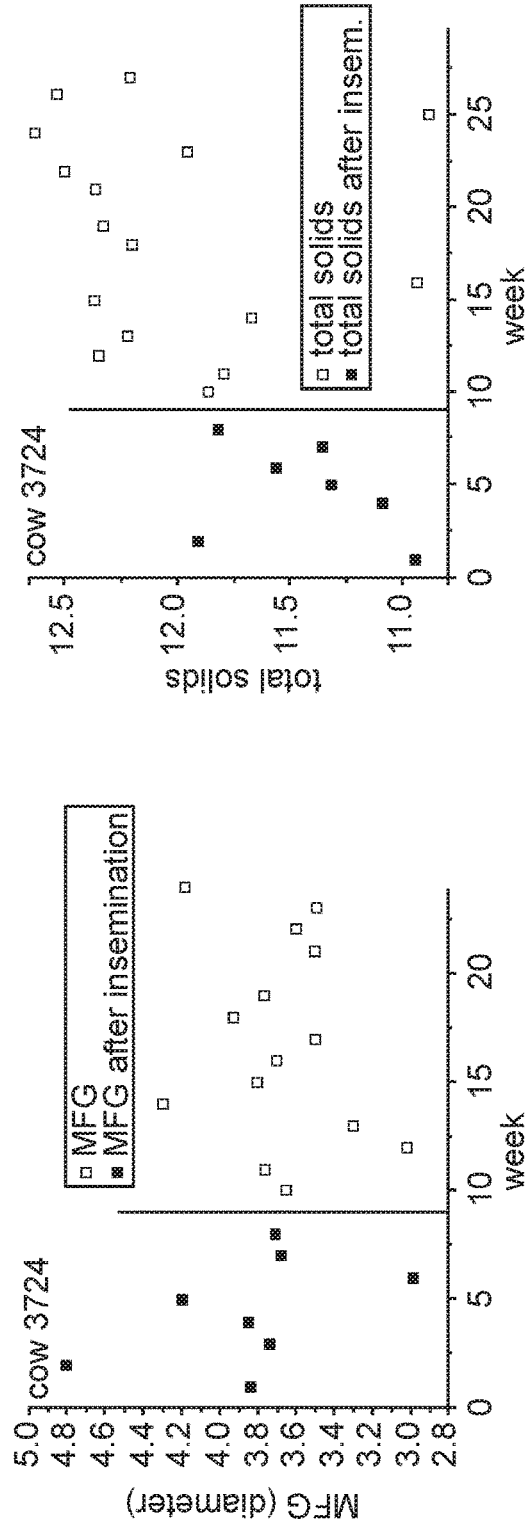

The correlation may be implemented by using a Principal Component Analysis (PCA) to confirm the sensitivity of dielectric spectroscopy to the changes caused by pregnancy state. PCA is a statistical method used in exploratory data analysis and to make predictive models. Using PCA, the dimensionality of large data sets is reduced, increasing the interpretability and at the same time, minimizing information loss. In this connection, it should be noted that the combination of the different MS parameters, in particular of the dielectric parameters with the MFG size in the PCA analysis provided an identifiable pattern enable to determine or even predict the progesterone-associated physiological state of the cow. The identifiable patterns being indicative of the progesterone-associated physiological state of the cow are illustrated for example in FIG. 22H or FIG. 23H showing the total solids pattern.

Mathematically, in PCA the original data matrix [D] is decomposed into a principal component matrix [R] and a matrix of weights [C] (equation 3)

$$[D]=[R]\cdot[C] \quad (3)$$

Where [R] and [C] and determines as equations (4) and (5)

$$[R]=[D]\cdot[Q] \quad (4)$$

$$[C]=[Q]T \quad (5)$$

Figure 24B:
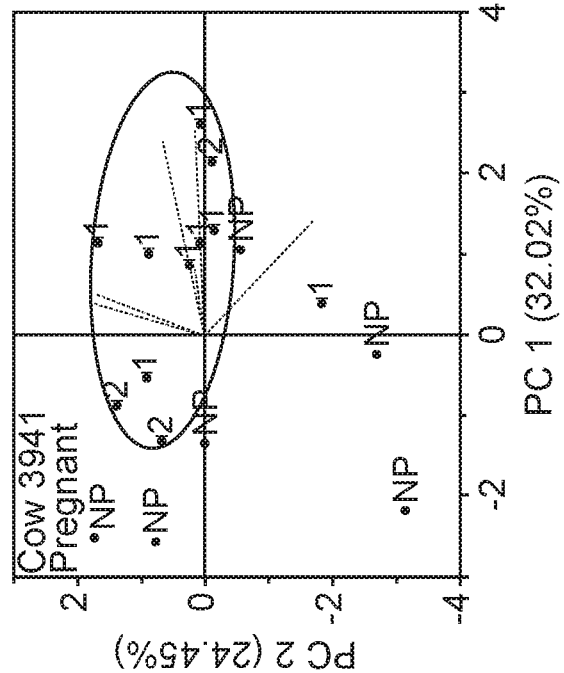
FIGS. 24A-24B show PCA Bi plots of the data correspondent to confirmed pregnant cows 3724 and 3941.
Figure 24A:
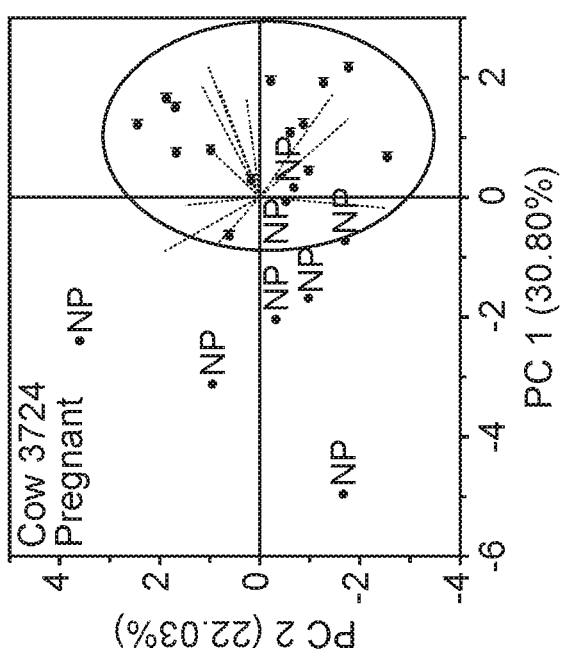

In these equations, [Q] is the eigenvector matrix of the covariance matrix $[Z]=[D]T\cdot[D]\cdot[12]$ PCA has been applied for individual cows that were confirmed as pregnant, on the entire dataset obtained before insemination, until pregnant diagnostic. FIGS. 24A-24B show the PCA Bi plots of the data correspondent to confirmed pregnant cows (3724 and 3941). The two first principal components sum around the 55% of all data variability.

An easy differentiation between non-pregnancy and insemination state can be done in the case of cows which insemination was successful. PCA analysis has been done using both biological and dielectric parameters.

Interestingly, cow 3941 (pregnant) that was inseminated twice showed the pregnancy stage pattern even since the first insemination, dielectric parameters show a reduction of variability, characteristic for pregnant cows right after insemination 1. It is possible, that pregnancy occurred after the 1st insemination which caused which led to clear data aggrupation. Given a 2nd insemination was recorded 9 weeks after the 1st insemination, the cow was assumed underwent spontaneous abortion (i.e., early embryonic death), appeared in estrous and inseminated again (2nd insemination) which was a successful one expressed by the distribution of data. These patterns strongly support that reproductive status (pregnant vs non pregnant) can be diagnosed by milk properties, as analyzed by PCA.

Additionally, the behavior of PCA plot may show when that the cow was pregnant (e.g. just after the second insemination (12)), when the data starts to crowd as it is characteristic for pregnancy state. Based on the insemination cycles, the cow may be determined as cyclic (i.e., appeared in estrous every 21 days).

Interestingly, a unique dielectric pattern of the data set is identified which might be associated with the health status of the cow. Therefore, the control unit may proceed with a correlation between the dielectric pattern and the health status of the cow. A prediction can be used by PCA to health status in addition to pregnancy status.

Although embodiments of the invention have been described by way of illustration, it will be understood that the invention may be carried out with many variations, modifications, and adaptations, without exceeding the scope of the claims.

The invention claimed is:

1. A method for determining the progesterone-associated physiological state of a lactating cow comprising:
   determining at least one Milk Solid (MS)-related physical parameter in at least one milk sample from a lactating cow, comprising determining at least one of size, size distribution, or at least one dielectric parameter being affected by a change in MS-related physical parameter parameters; and
   determining the progesterone-associated physiological state according to the MS-related physical parameter, wherein the Milk Solids are selected from fat, protein, and lactose.

2. The method according to claim 1, wherein determining the progesterone-associated physiological state of the cow comprises correlating the MS-related parameter with calibrated data.

3. The method according to claim 1, wherein the size comprises: average MS size, MS mean diameter, size distribution of MSs, % change in MS size, % change in MS size over time or rate of change in MS size, wherein the size distribution and change are relative to the average basal MS size of the cow.

4. The method according to claim 1, wherein determining at least one dielectric parameter being affected by the change in MS-related physical parameters comprises identifying a dielectric response of water in at least one milk sample, determine at least one variation of the dielectric pattern of the MS and analyzing at least one change in the dielectric pattern including at least one of static dielectric permittivity, or a shift.

5. The method according to claim 1, wherein determining at least one dielectric parameter of the MS comprises extracting from a dielectric spectrum of the milk sample in a frequency range of about 0.5 GHz to 60 GHz, data indicative of a measurable change in at least one of such spectral parameters as broadening and position of a main relaxation peak of the dielectric spectrum, said main relaxation peak being associated with the dielectric response of the water, and said change in the spectral parameters of said main relaxation peak in said frequency range being indicative of a modification response of the at least one MS parameter caused by changes in progesterone levels.

6. The method according to claim 1, wherein determining the progesterone-associated physiological state of cow comprises fitting a measured dielectric spectrum of the milk sample to the Cole-Cole dielectric function and a conductivity term as follows:

$$\varepsilon^*(\omega) = \frac{\Delta\varepsilon}{1+(i\omega\tau)^\alpha} + \frac{\sigma}{i\omega\varepsilon_n} + \varepsilon_\infty$$

where $\Delta\varepsilon$ is the dielectric strength, $\tau$ is the characteristic relaxation time, $\alpha$ is the broadening parameter, $\sigma$ is the dc conductivity, $\varepsilon_\beta$ is the permittivity of free space and $\varepsilon_\infty$ is the high frequency limit of the real component of the dielectric permittivity.

7. The method according to claim 1, wherein determining at least one MS-related physical parameter comprises using a machine-learning model trained using a set of historical data.

8. The method according to claim 1, where the progesterone associated physiological state is selected from the group consisting of: anestrus state, estrous state, pregnant state, undergoing an abortion, in the increasing or decreasing phase of the estrous cycle, mastitis, ketosis, inflammation.

9. A method according to claim 1, wherein the MSs comprise milk fat globules.

10. A system for determining the progesterone-associated physiological state of a cow comprising a control unit being configured and operable to receive size data being indicative of at least one Milk Solid (MS)-related parameter, determine said at least one related physical parameter in at least one milk sample from a lactating cow; and determine the progesterone-associated physiological state according to the MS-related physical parameter.

11. The system according to claim 10, wherein the control unit is configured and operable to determine the progesterone-associated physiological state comprises by correlating the MS-related physical parameter with calibrated data.

12. The system according to claim 11, further comprising an MS-related physical parameter measurement module being configured and operable to measure at least one MS-related physical parameter.

13. The system according to claim 12, wherein said MS-related physical parameter measurement module comprises a dielectric spectroscopy module being configured and operable to measure at least one dielectric parameter of at least one milk sample.

14. The system according to claim 10, wherein the at least one MS-related physical parameter comprises at least one of size, a pattern of progesterone concentration or direction of progesterone concentration, or at least one dielectric parameter of the MS.

15. The system according to claim 10, wherein the control unit is configured and operable to identify at least one dielectric parameter being affected by a change in MS related physical parameter parameters is by a dielectric response of water in at least one milk sample, determine at least one variation of the dielectric pattern of the MS and analyze at least one change in the dielectric pattern including at least one of static dielectric permittivity, a shift and broadening in a main relaxation process peak and appearance of the DC conductivity tail.

16. The system according to claim 10, wherein said control unit is configured and operable to determine the MS-related physical parameter by using a machine-learning model trained using a set of historical data.

17. A system for determining the progesterone-associated physiological state of a cow comprising a control unit being configured and operable to determine at least one Milk Solid (MS)-related physical parameter in at least one milk sample from a lactating cow; and determine the progesterone-associated physiological state according to the MS-related physical parameter, wherein the at least one MS-related physical parameter comprises at least one of size, a pattern of progesterone concentration or direction of progesterone concentration, or at least one dielectric parameter of the MS.

18. The system according to claim 17, wherein the control unit is configured and operable to receive size data being indicative of the MS-related parameter.

19. A system for determining the progesterone-associated physiological state of a cow comprising a control unit being configured and operable to determine at least one Milk Solid (MS)-related physical parameter in at least one milk sample from a lactating cow; and determine the progesterone-associated physiological state according to the MS-related physical parameter, wherein:
the control unit is configured and operable to determine the progesterone-associated physiological state comprises by correlating the MS-related physical parameter with calibrated data,
the system further comprises an MS-related physical parameter measurement module being configured and operable to measure at least one MS-related physical parameter, said MS-related physical parameter measurement module comprising a dielectric spectroscopy module being configured and operable to measure at least one dielectric parameter of at least one milk sample.

* * * * *